(12) United States Patent
Kitano

(10) Patent No.: US 10,594,762 B2
(45) Date of Patent: Mar. 17, 2020

(54) ASSOCIATING USERS BASED ON USER-ACCESS POSITIONS IN SEQUENTIAL CONTENT

(75) Inventor: Hiroaki Kitano, Saitama (JP)

(73) Assignee: Sony Corporation, Tokyo (JP)

( * ) Notice: Subject to any disclaimer, the term of this patent is extended or adjusted under 35 U.S.C. 154(b) by 574 days.

(21) Appl. No.: 14/360,006

(22) PCT Filed: Aug. 31, 2012

(86) PCT No.: PCT/JP2012/005533
§ 371 (c)(1),
(2), (4) Date: May 22, 2014

(87) PCT Pub. No.: WO2013/080407
PCT Pub. Date: Jun. 6, 2013

(65) Prior Publication Data
US 2014/0258414 A1 Sep. 11, 2014

(30) Foreign Application Priority Data
Dec. 2, 2011 (JP) .................. 2011-265122

(51) Int. Cl.
*H04L 29/08* (2006.01)
*G06Q 10/10* (2012.01)

(52) U.S. Cl.
CPC .......... *H04L 67/02* (2013.01); *G06Q 10/10* (2013.01)

(58) Field of Classification Search
CPC .................................................. H04L 67/02
USPC ........................................ 709/204; 715/733
See application file for complete search history.

(56) References Cited

U.S. PATENT DOCUMENTS

| 5,987,525 A | 11/1999 | Roberts et al. |
| 7,707,246 B1* | 4/2010 | Issa ................. G06Q 10/10 709/204 |
| 8,892,630 B1* | 11/2014 | Curtis ............... G06Q 30/0282 709/203 |
| 8,965,874 B1* | 2/2015 | Vassilakis ........ G06F 17/30867 705/319 |
| 2009/0144773 A1* | 6/2009 | Cavanaugh ........ H04N 5/44543 725/44 |
| 2009/0157667 A1* | 6/2009 | Brougher ............ G06Q 10/063 |
| 2009/0222520 A1* | 9/2009 | Sloo .................. H04N 7/17318 709/205 |
| 2009/0248882 A1* | 10/2009 | Takagi ................. G06Q 10/10 709/229 |

(Continued)

FOREIGN PATENT DOCUMENTS

| JP | 2001-521642 A | 11/2001 |
| JP | 2010-262441 A | 11/2010 |

OTHER PUBLICATIONS

International Search Report from International Application No. PCT/JP2012/005533 dated Nov. 27, 2012.

*Primary Examiner* — Tonia L Dollinger
*Assistant Examiner* — Ishrat Rashid
(74) *Attorney, Agent, or Firm* — Chip Law Group

(57) ABSTRACT

According to an illustrative embodiment, an information processing system is provided. The information processing system includes at least one control unit to designate a user-access position within sequential content at which a user accesses the sequential content, and to associate the user with other users who each access the sequential content at a position that is the same, or close to, the user-access position.

10 Claims, 16 Drawing Sheets

(56) References Cited

U.S. PATENT DOCUMENTS

| | | | |
|---|---|---|---|
| 2009/0276821 A1* | 11/2009 | Amento | H04N 7/17318 |
| | | | 725/116 |
| 2012/0036431 A1 | 2/2012 | Ito et al. | |
| 2012/0151351 A1* | 6/2012 | Kilroy | G06Q 30/02 |
| | | | 715/733 |
| 2013/0061140 A1* | 3/2013 | Nseir | G06F 16/9535 |
| | | | 715/273 |

* cited by examiner

[Fig. 1]
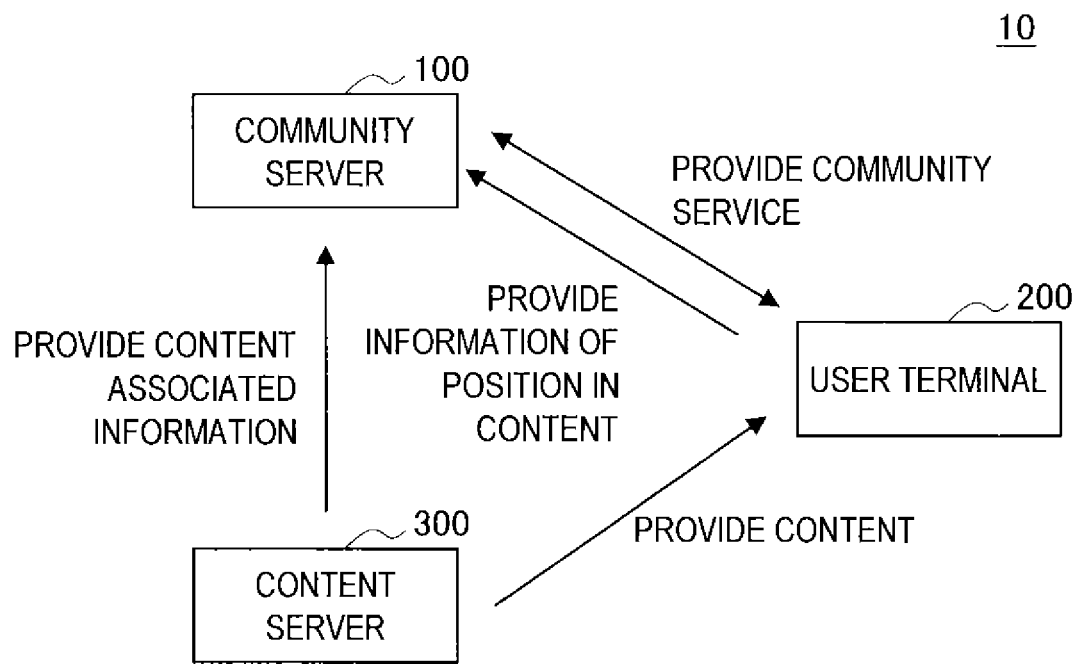

[Fig. 2]
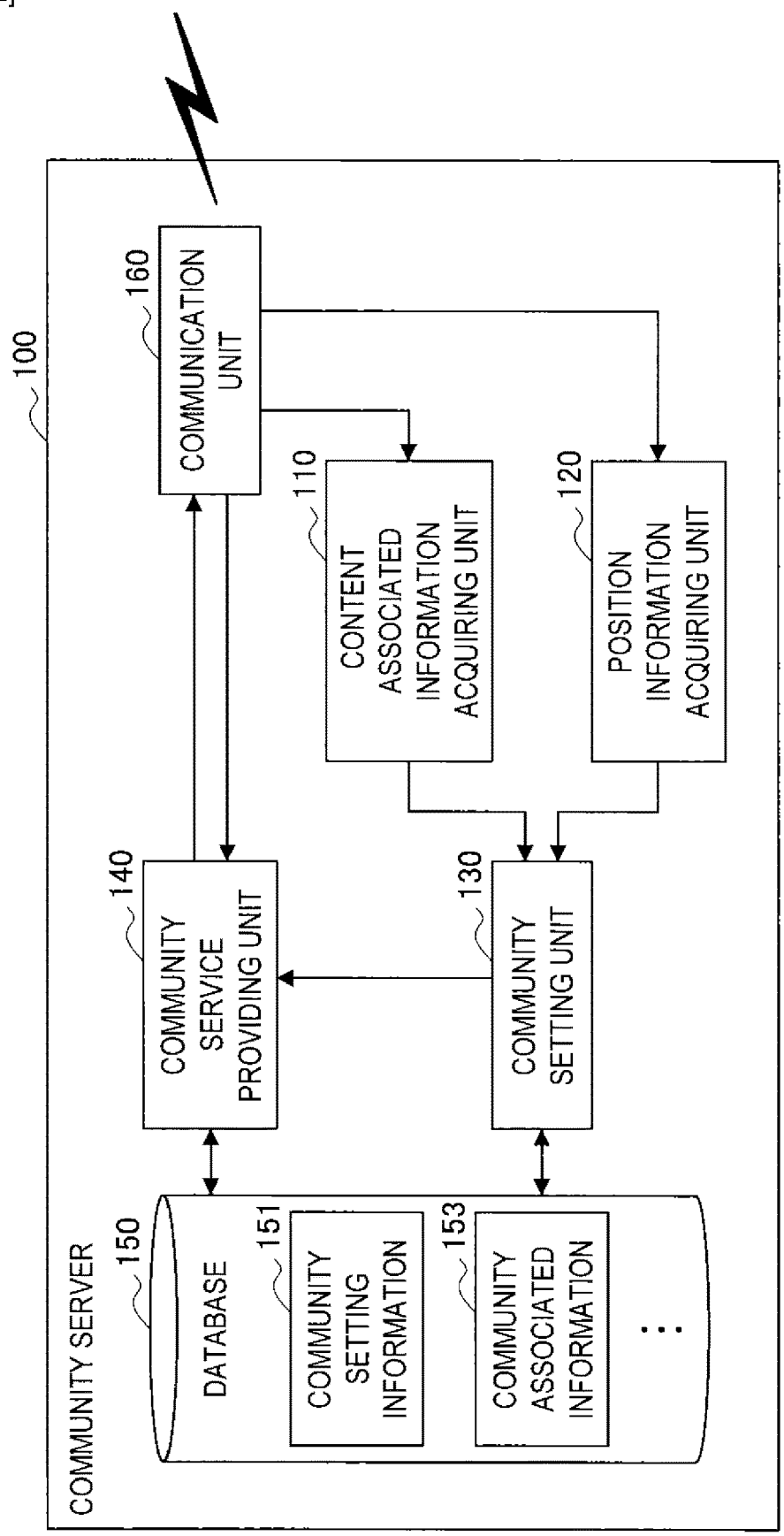

[Fig. 3]
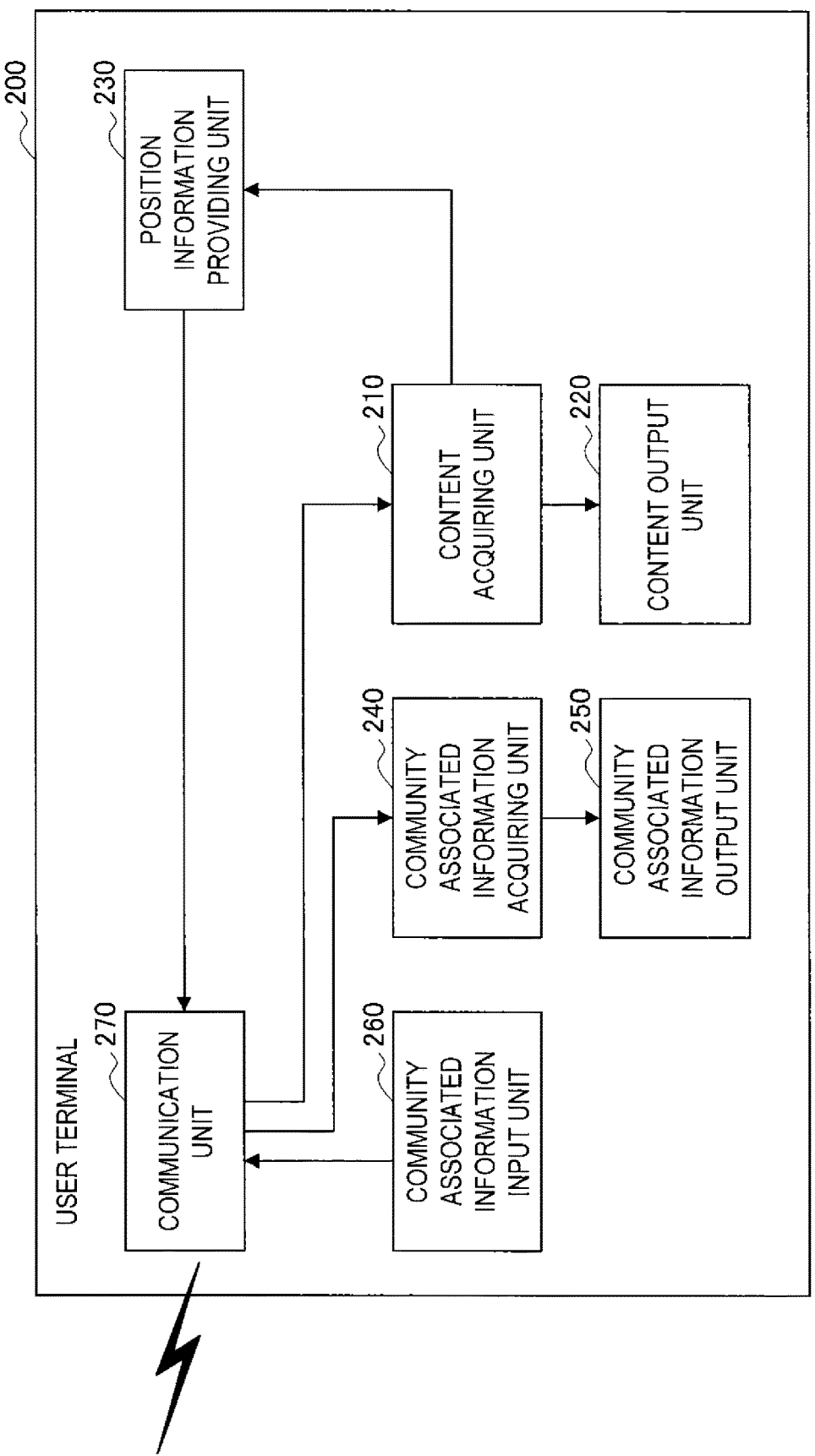

[Fig. 4]
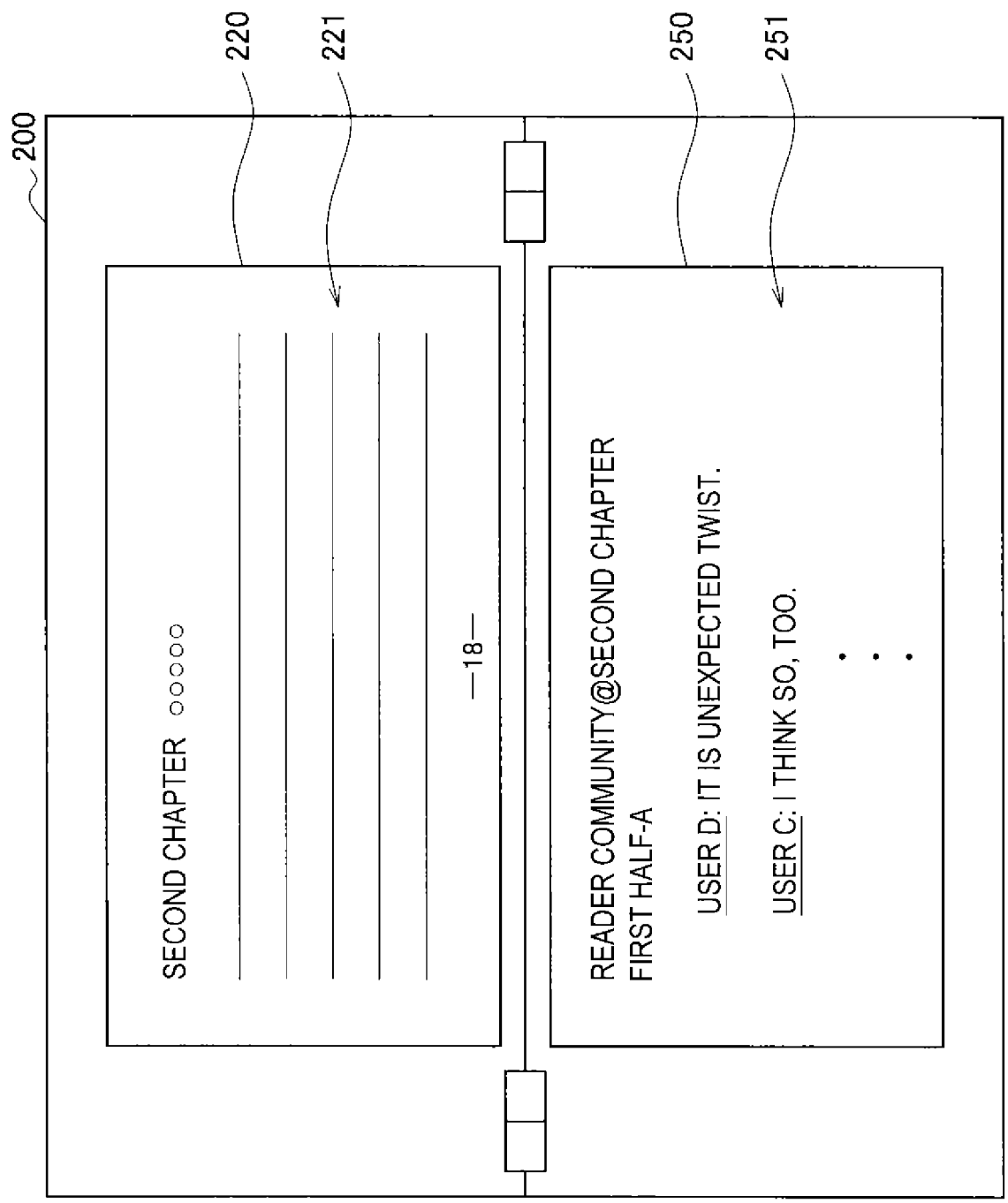

[Fig. 5]
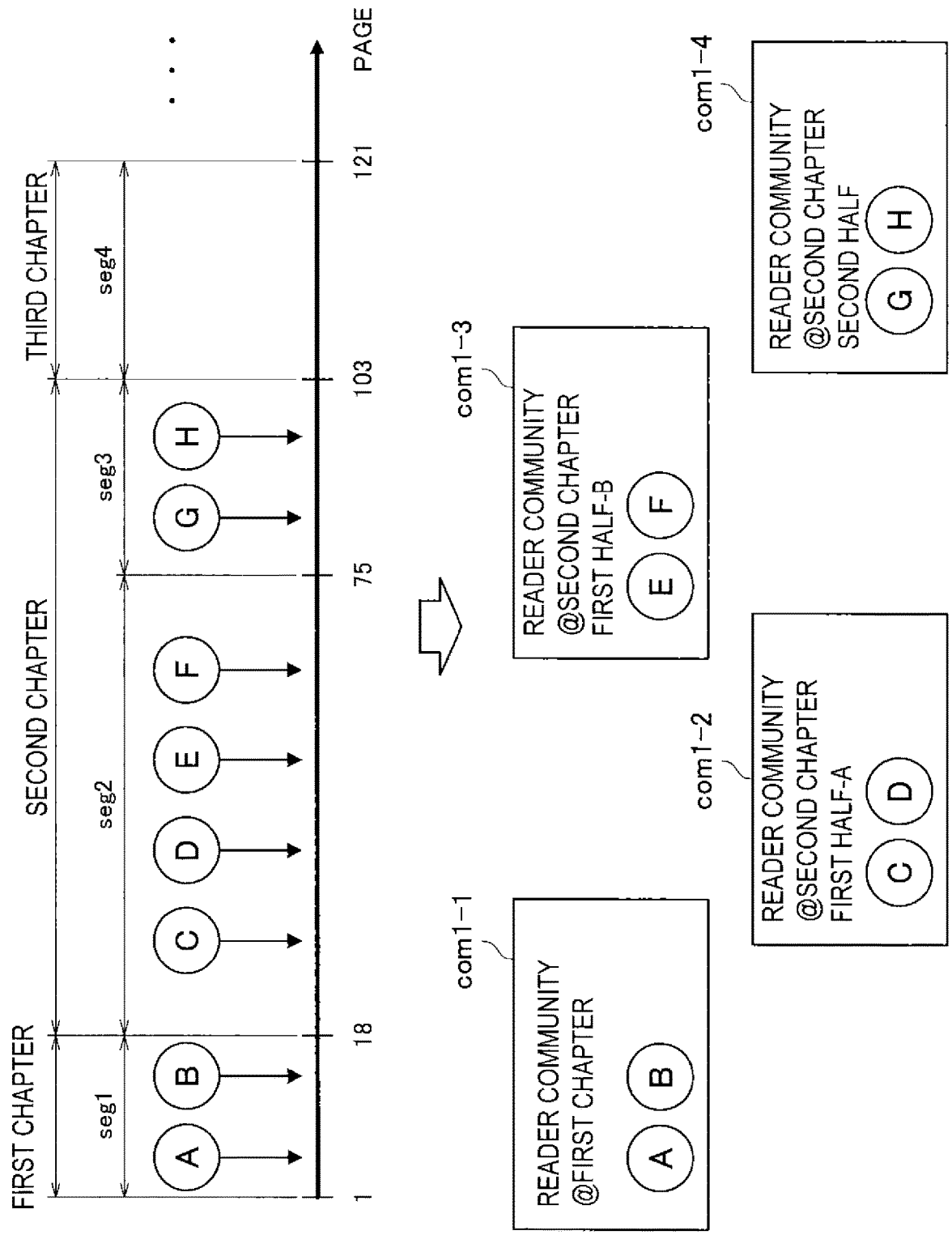

[Fig. 6]
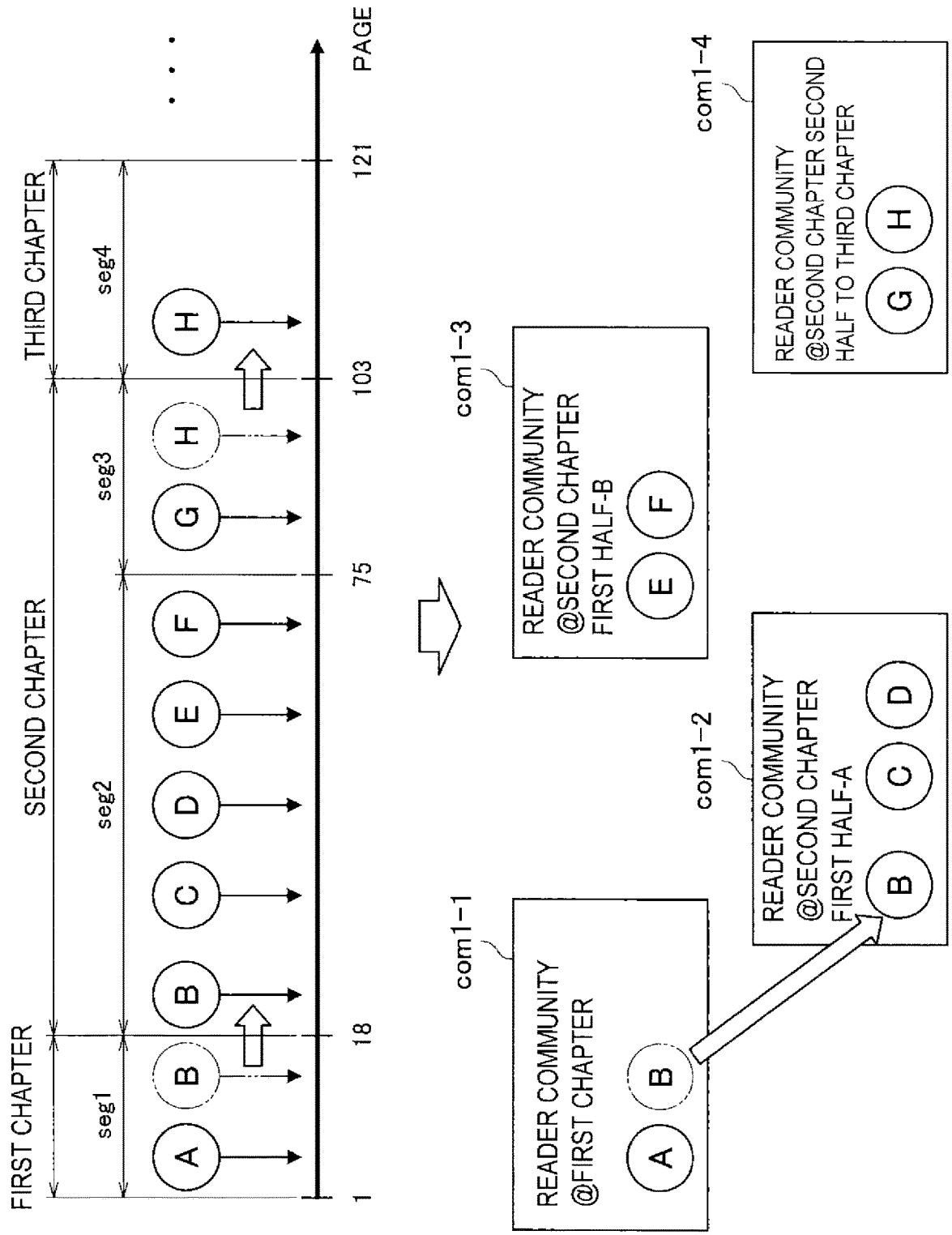

[Fig. 7]
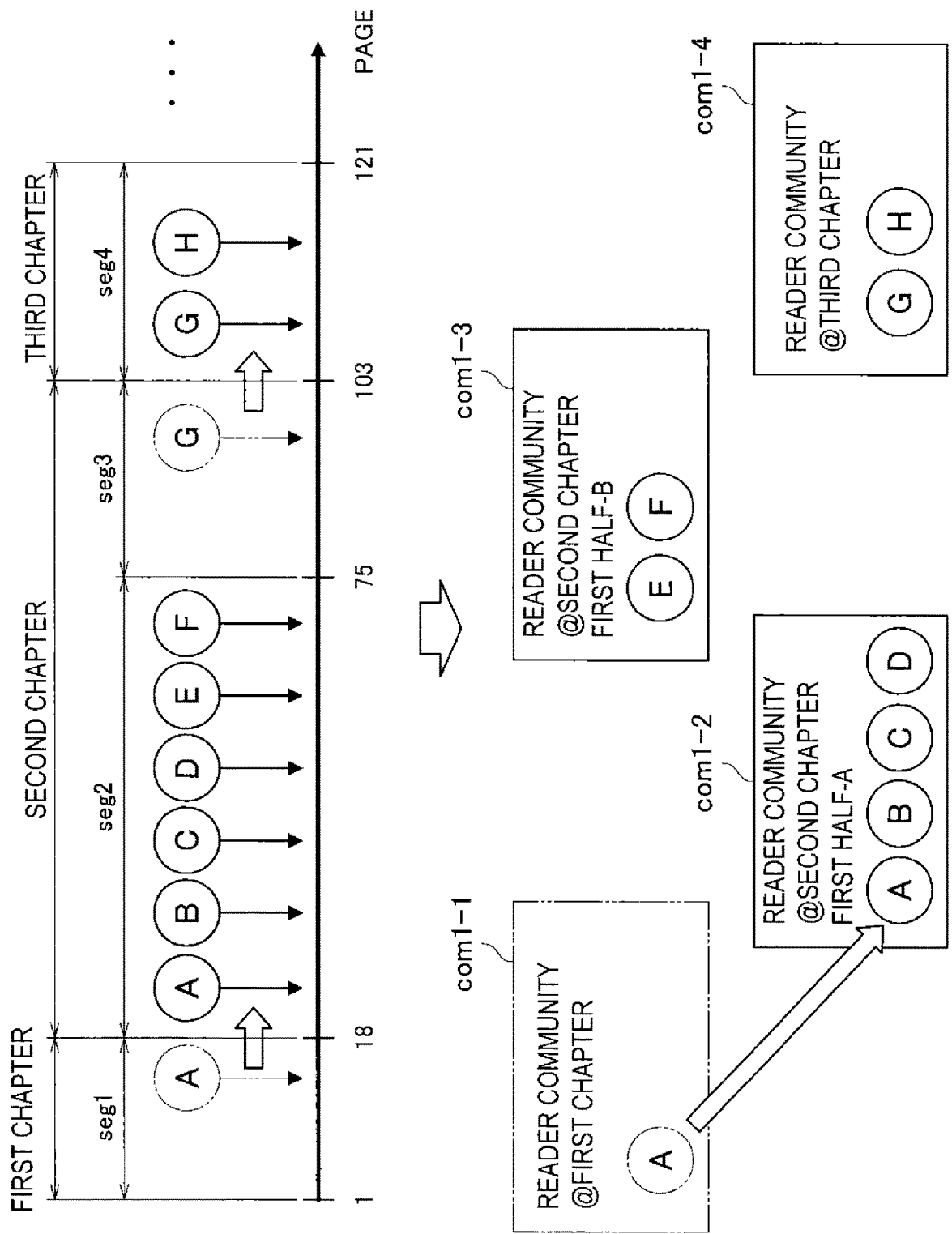

[Fig. 8]
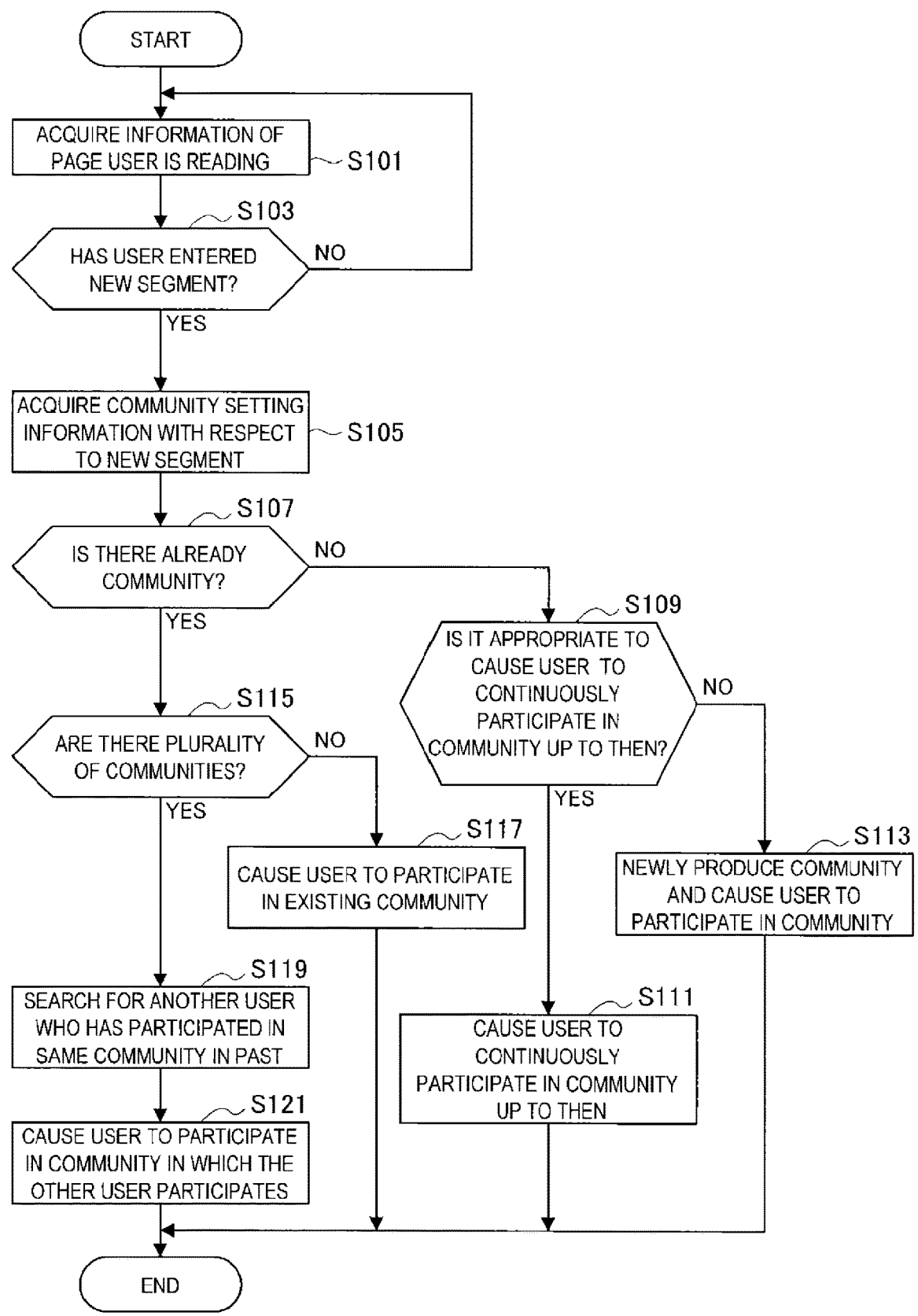

[Fig. 9]
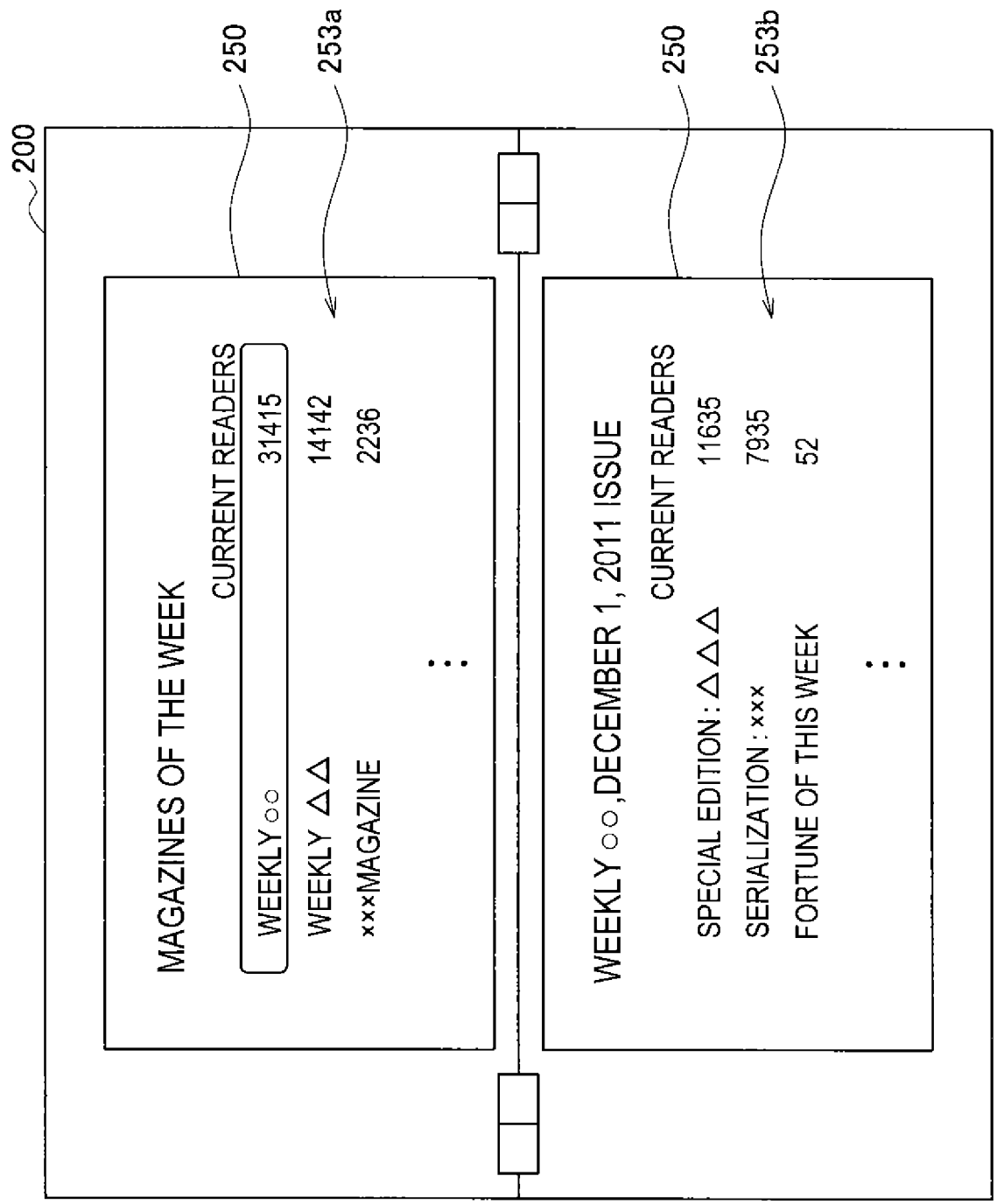

[Fig. 10]
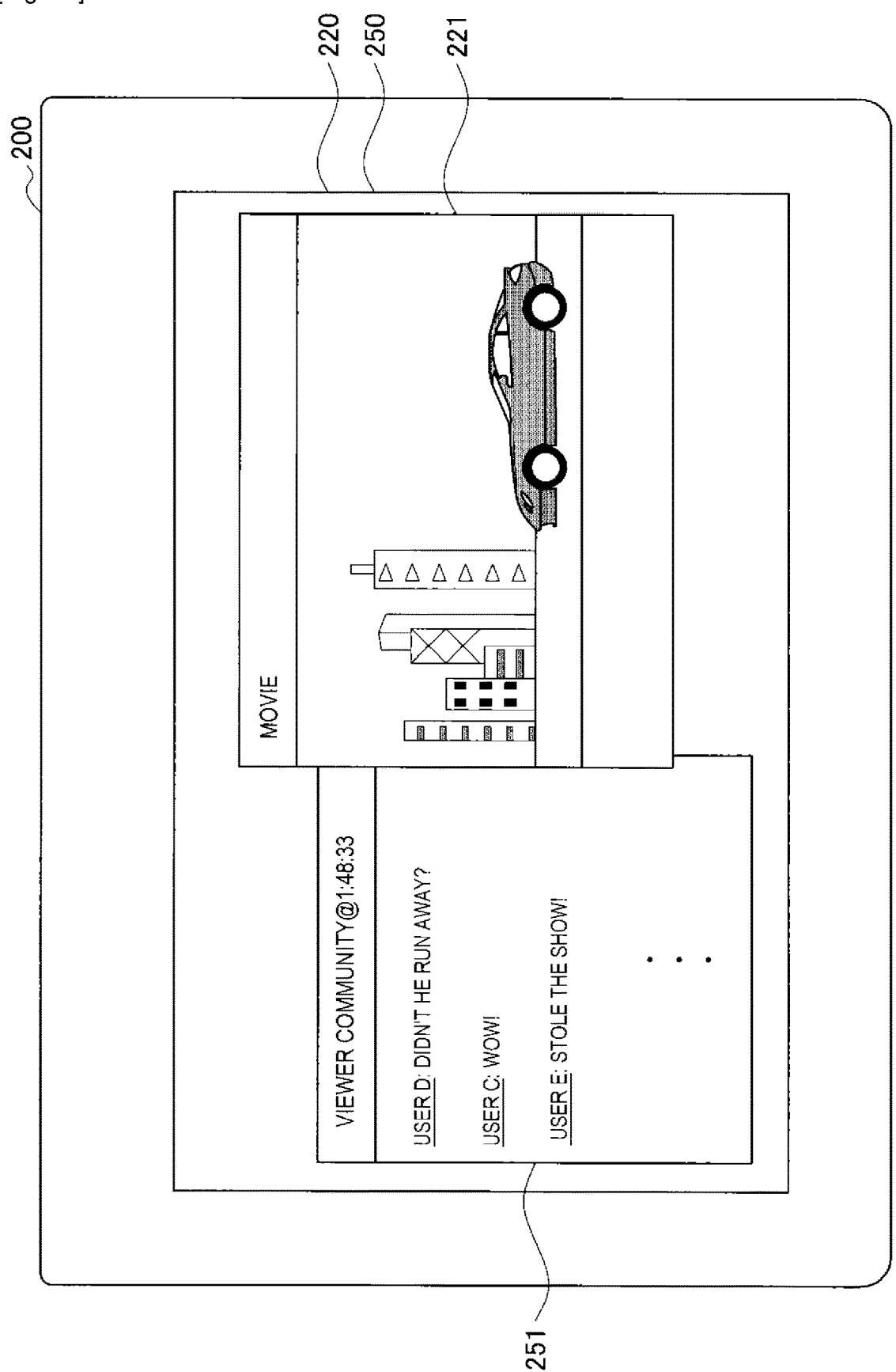

[Fig. 11]
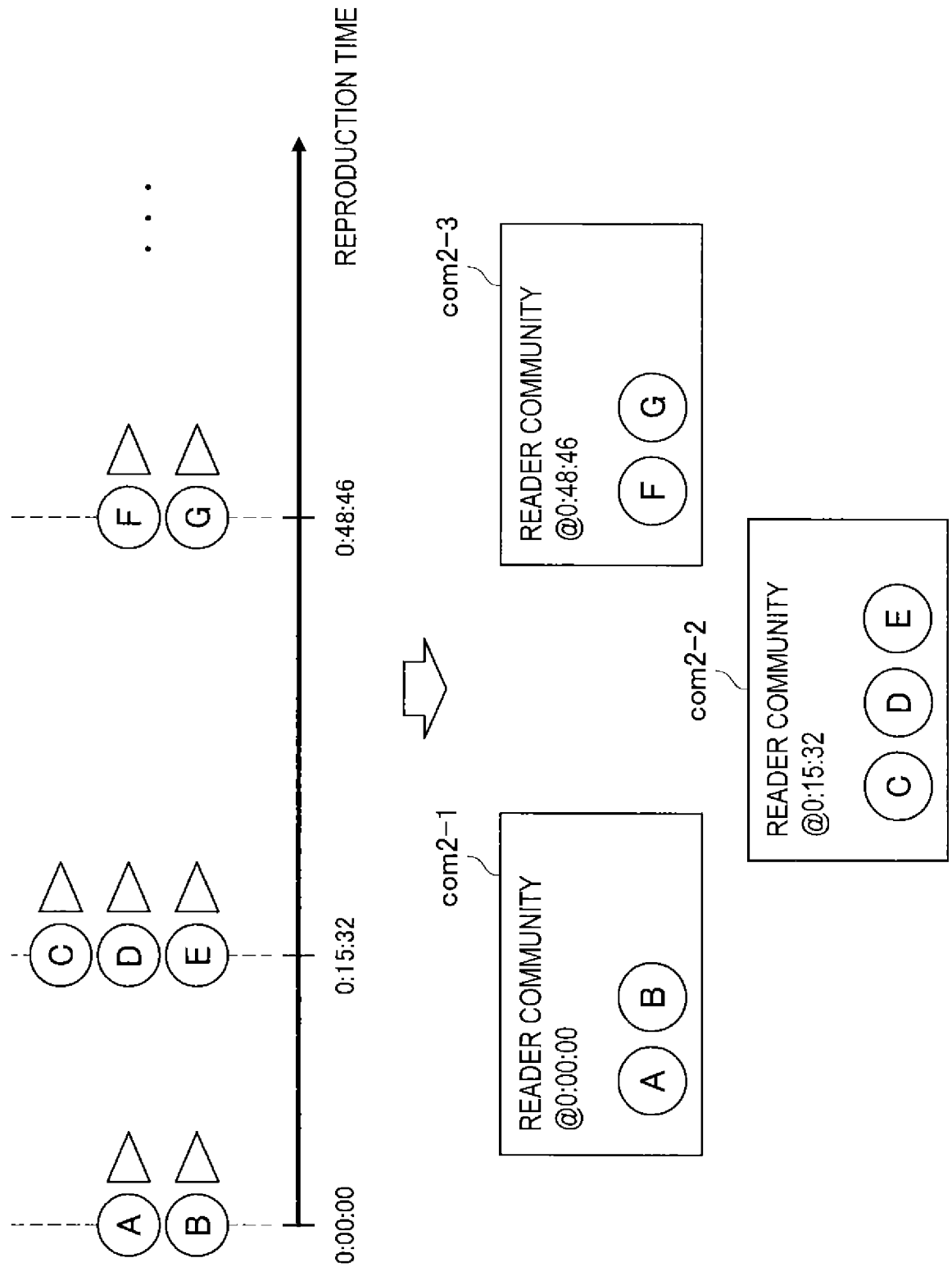

[Fig. 12]
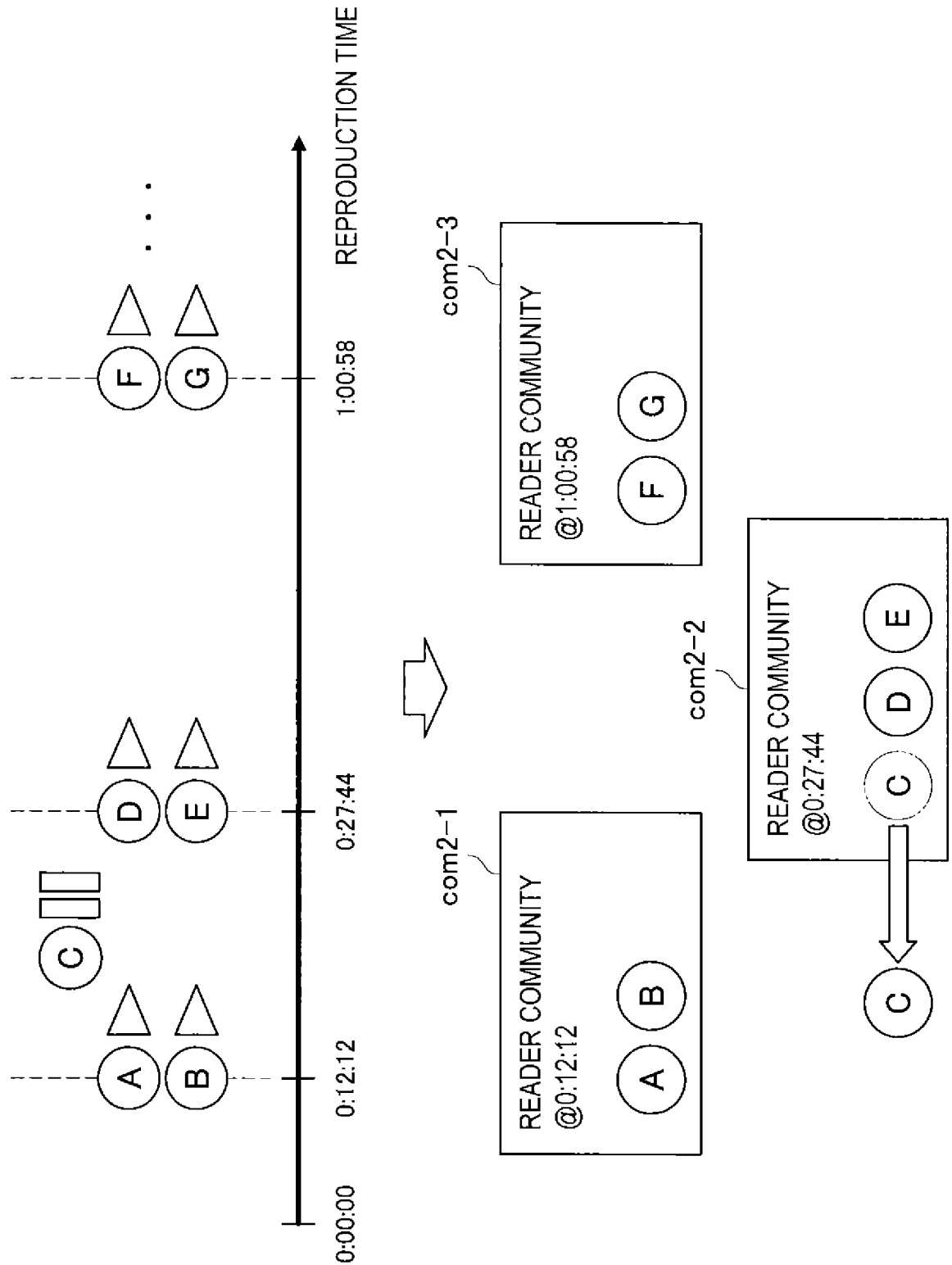

[Fig. 13]
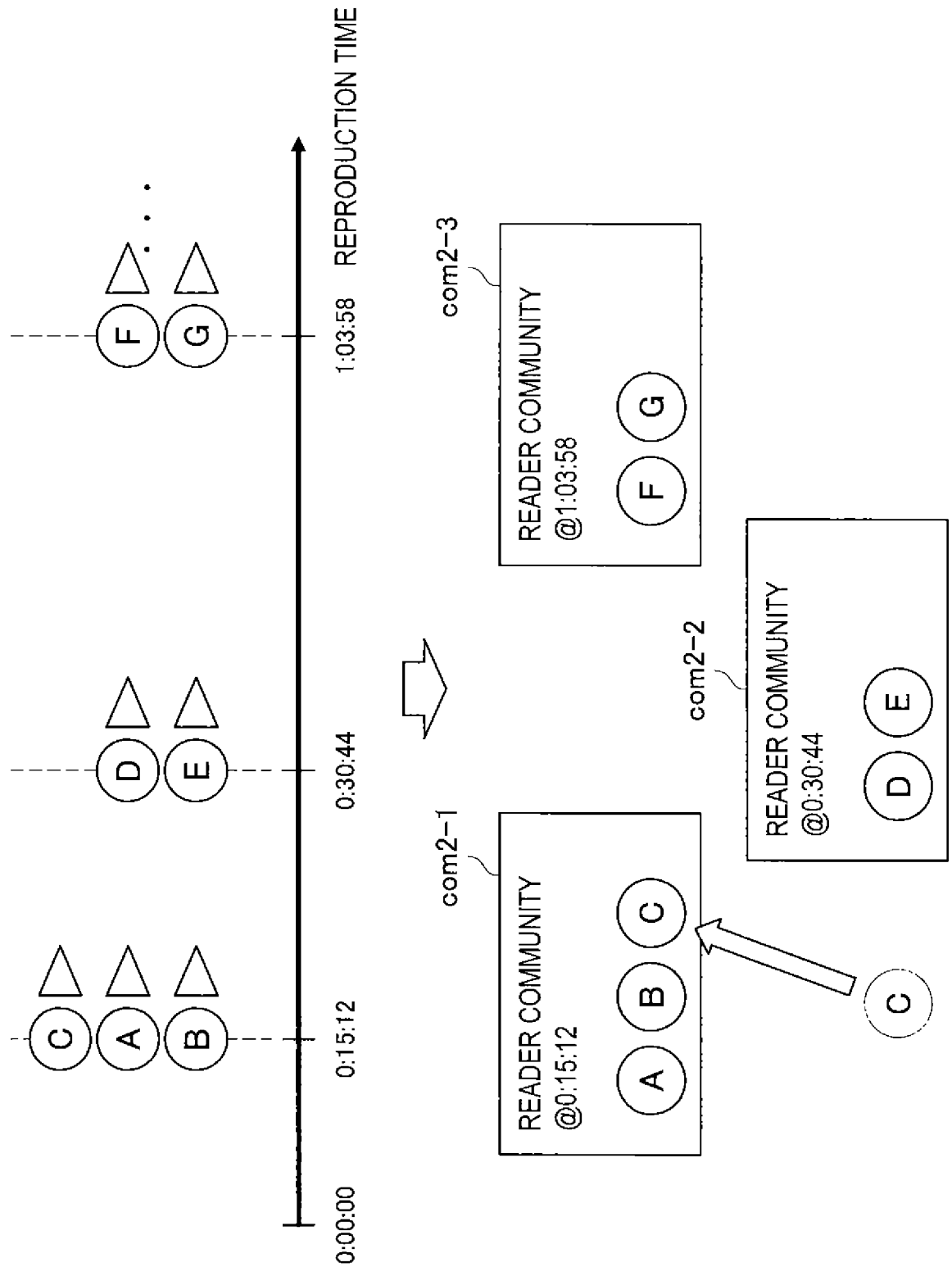

[Fig. 14]
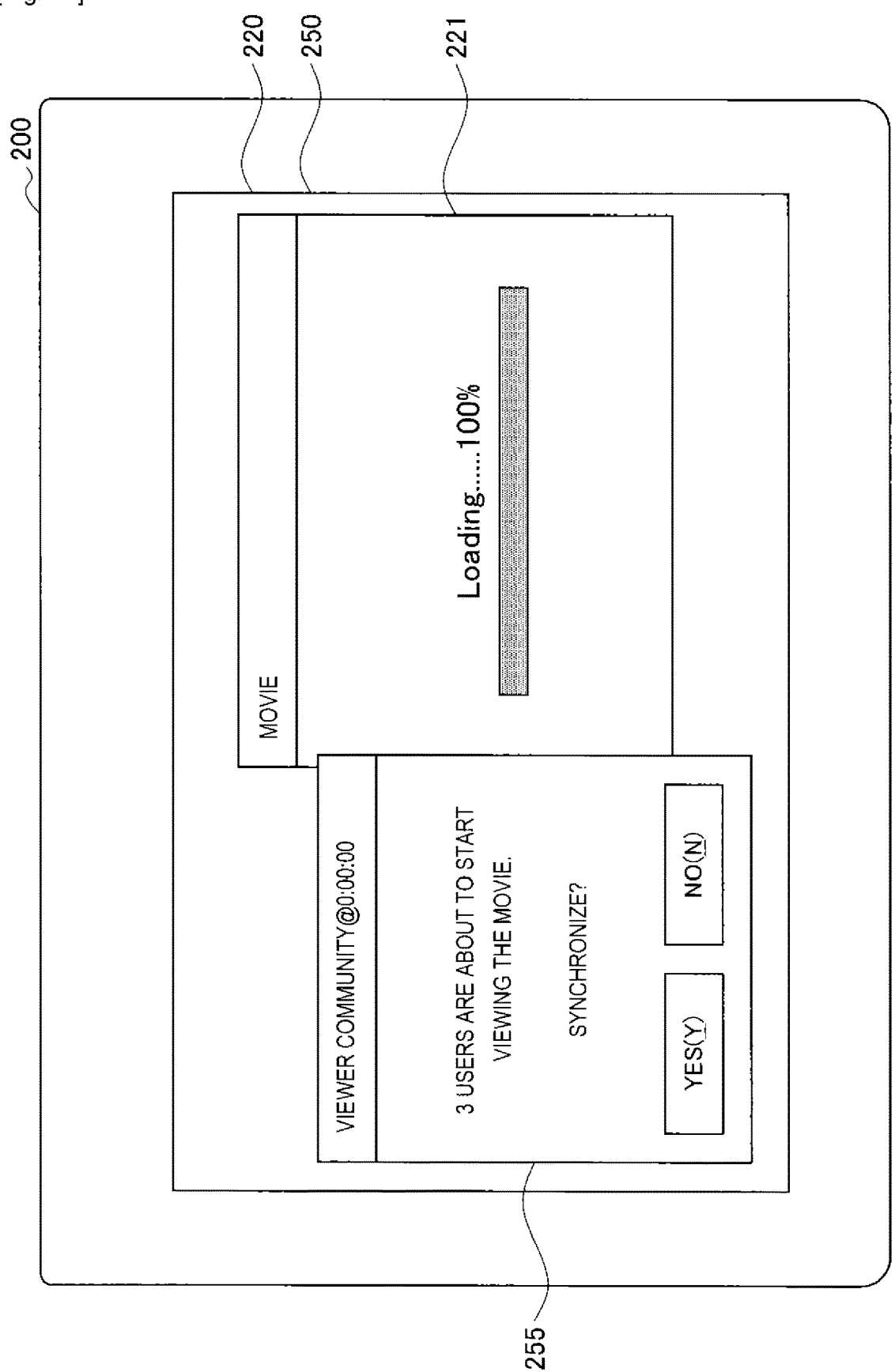

[Fig. 15]
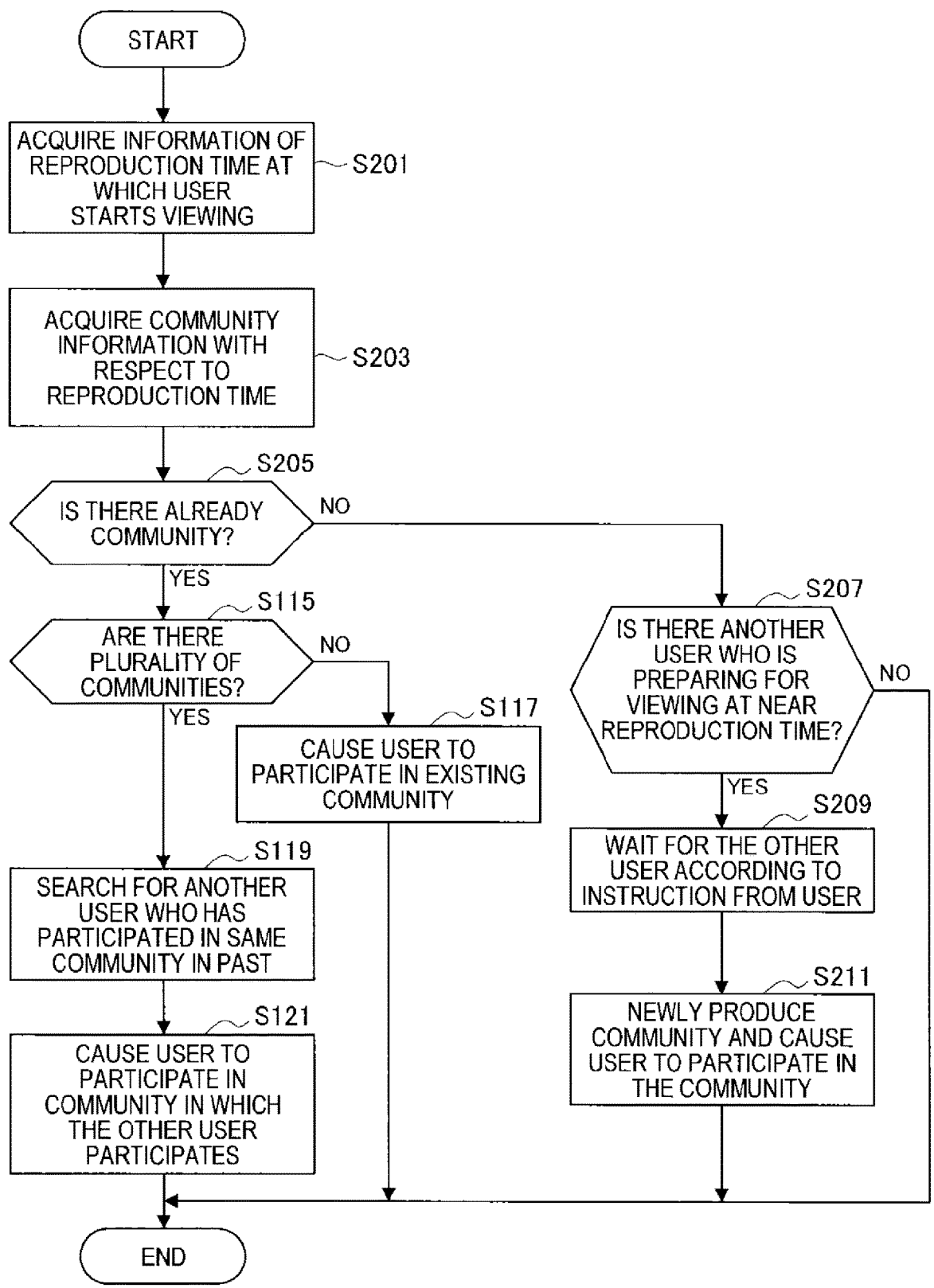

[Fig. 16]
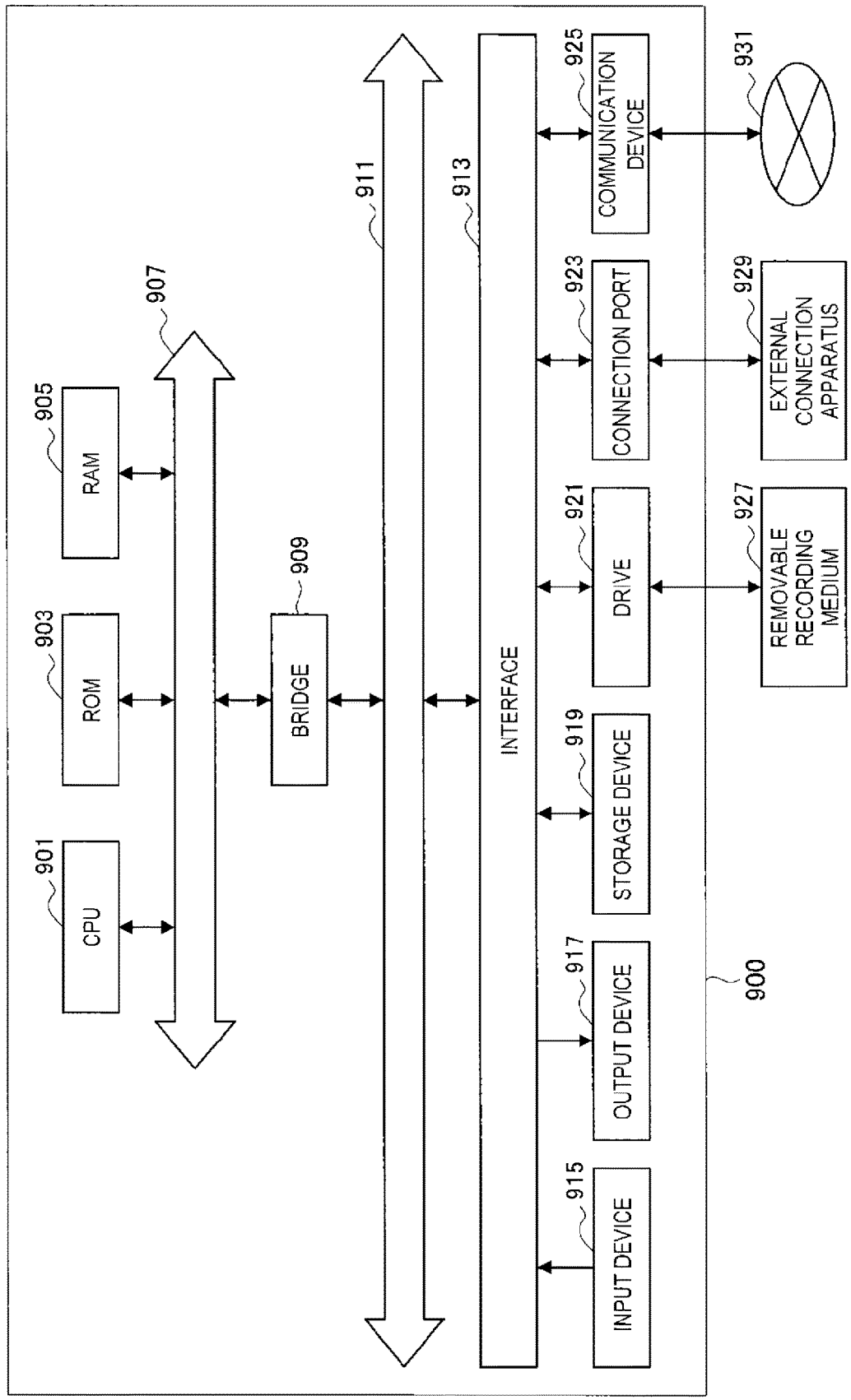

ASSOCIATING USERS BASED ON USER-ACCESS POSITIONS IN SEQUENTIAL CONTENT

CROSS-REFERENCE TO RELATED APPLICATION

The present application is a national phase entry under 35 U.S.C. § 371 of International Application No. PCT/JP2012/005533 filed Aug. 31, 2012, published on Jun. 6, 2013 as WO 2013/080407 A1, which claims priority from Japanese Patent Application No. JP 2011-265122 filed in the Japanese Patent Office on Dec. 2, 2011.

TECHNICAL FIELD

The present disclosure relates to a server device, a terminal device, and a program and more particularly, to a server device, a terminal device, and a program to provide a communication service between users.

BACKGROUND ART

Recently, use of various pieces of content using terminal devices such as a personal computer (PC) or a mobile phone (smart phone) which a user possesses has spread. Examples of the pieces of content include electronic books described in Patent Literature 1 and moving image content distributed through a network. Technology for adding additional information to content and providing the content has been suggested. For example, technology for adding metadata to an electronic book and displaying information associated with an information item included in the electronic book has been suggested in Patent Literature 1.

CITATION LIST

Patent Literature

[PTL 1]
JP 2010-262441A

SUMMARY

Technical Problem

Meanwhile, a communication service in a community on a network to be accessed by a terminal device which a user possesses has spread rapidly in recent years. The communication service is, for example, a social networking service (SNS). In the community, users perform communication using a bulletin board system (BBS) or chatting. As topics of such communication, the pieces of content described above are used often.

However, the content such as the electronic book or the moving image content is sequential content that progresses with a page or reproduction time. Therefore, an appropriate communication place changes according to a portion of the content which the user accesses. For example, it is assumed that content of a topic is different between a user who has finished reading almost the first half of a certain electronic book and a user who has finished reading the electronic book. If these users perform communication on the same place, the user who has not finished reading the electronic book may know the ending of a story before finishing reading the electronic book and lose interest in the electronic book.

The technology described in Patent Literature 1 described above does not come to sufficiently meet the demand of the user. Accordingly, it is desirable to provide a server device, a terminal device, and a program that enable an appropriate communication place to be provided to a user who is using sequential content.

Solution to Problem

According to an illustrative embodiment, an information processing system is provided. The information processing system includes at least one control unit to designate a user-access position within sequential content at which a user accesses the sequential content, and to associate the user with other users who each access the sequential content at a position that is the same, or close to, the user-access position.

BRIEF DESCRIPTION OF DRAWINGS

FIG. 1 is a schematic diagram of a system according to a first embodiment of the present disclosure.
FIG. 2 is a block diagram illustrating a functional configuration of a community server according to the first embodiment of the present disclosure.
FIG. 3 is a block diagram illustrating a functional configuration of a user terminal according to the first embodiment of the present disclosure.
FIG. 4 is a diagram illustrating an example of display in the first embodiment.
FIG. 5 is a diagram illustrating an example of community setting in the first embodiment of the present disclosure.
FIG. 6 is a diagram illustrating an example of community setting in the first embodiment of the present disclosure.
FIG. 7 is a diagram illustrating an example of community setting in the first embodiment of the present disclosure.
FIG. 8 is a flowchart illustrating an example of processing in the first embodiment of the present disclosure.
FIG. 9 is a diagram illustrating an example of display of a table of contents in the first embodiment of the present disclosure.
FIG. 10 is a diagram illustrating an example of display in a second embodiment of the present disclosure.
FIG. 11 is a diagram illustrating an example of community setting in the second embodiment of the present disclosure.
FIG. 12 is a diagram illustrating an example of community setting in the second embodiment of the present disclosure.
FIG. 13 is a diagram illustrating an example of community setting in the second embodiment of the present disclosure.
FIG. 14 is a diagram illustrating an example of synchronization setting display in the second embodiment of the present disclosure.
FIG. 15 is a flowchart illustrating an example of processing in the second embodiment of the present disclosure.
FIG. 16 is a block diagram illustrating a hardware configuration of an information processing apparatus.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. First Embodiment
1-1. System Configuration
1-2. Provided Service
1-3. Community Setting
1-4. Processing Flow
1-5. Display of Table of Contents
1-6. Summary of First Embodiment
2. Second Embodiment
2-1. System Configuration
2-2. Provided Service
2-3. Community Setting
2-4. Synchronization Setting
2-5. Processing Flow
2-6. Summary of Second Embodiment
3. Summary 1. First Embodiment First, a first embodiment of the present disclosure will be described with reference to FIGS. 1 to 9. In the first embodiment, a user uses content of an electronic book using a terminal device.

The electronic book is provided for a user to read the electronic book, by digitizing a book to be paper media originally and displaying digitized content on a display unit of as an exclusive reader device, a PC, or a mobile phone. In general, a book is paged and the user reads the book in order of pages. This point is applicable to the electronic book. That is, the electronic content is an example of sequential content that progresses with a page.

In this case, the user may not read the electronic book in order from a first page to a last page of pages the electronic book. For example, in the case of a book such as a magazine, a method of using content in which the user does not read the book from the first page and reads the book sequentially from a page on which an interesting article is written is also assumed. The "sequential content" is a concept that includes the content described above. That is, the entire content may not be sequential and at least a part of the content may be sequential.

As described above, the content of the electronic book often becomes a topic of communication in a community on a network. In this case, the community is produced in a unit of book in many cases. For example, if the book is one novel, the community is produced in a unit of novel. In this case, a user who has finished reading the novel mainly participates in the community. This is because, if a user who has not finished reading the novel participates in the community, the user may know story development or the ending of the novel which the user has not read by remarks of other users and lose interest in the novel. Therefore, a user who has not finished reading the novel has to go on reading the novel without participating in the community.

This embodiment provides, in such a situation, a communication place in which a user who has not finished reading the book can enjoy communication.

1-1. System Configuration

First, a system configuration according to the first embodiment of the present disclosure will be described with reference to FIGS. 1 to 3. FIG. 1 is a schematic diagram of a system according to the first embodiment of the present disclosure. FIG. 2 is a block diagram illustrating a functional configuration of a community server according to the first embodiment of the present disclosure. FIG. 3 is a block diagram illustrating a functional configuration of a user terminal according to the first embodiment of the present disclosure.

Referring to FIG. 1, a system 10 according to this embodiment includes a community server 100, a user terminal 200, and a content server 300. The community server 100 and the content server 300 are server devices that are arranged on a network and provide various services to a user using the user terminal 200. The user terminal 200 is a terminal device such as a tablet PC, a notebook PC, a desktop PC, a mobile phone, a smart phone, a personal digital assistant (PDA), and various media players.

In the system 10, the content server 300 provides content to the user terminal 200. As described above, in this embodiment, the content is an electronic book. The content may be provided by transmitting data of the content stored in the content server 300 to the user terminal 200, whenever the user uses the content, or may be provided by collectively downloading the data of the content stored in the content server 300 when the user starts to use the content to the user terminal 200.

The content server 300 provides content associated information to the community server 100. In this embodiment, the content associated information includes information to identify the electronic book to be provided to the user terminal 200, information showing the number of pages in each electronic book, and information showing an amount of content in each page. The content associated information is provided to the community server 100, when the content server 300 starts to provide the content to the user terminal 200.

As described above, the content server 300 provides the content to the user terminal 200. The user terminal 200 provides the provided content to the user in a form of an image or a sound. In this embodiment, the content is an electronic book. Therefore, the user accesses the content by displaying pages of the electronic book on the user terminal 200 and reading the content. For example, when a sound such as effect sound or background music (BGM) is added to the electronic book, hearing the sound is also included in the access to the content. The user terminal 200 transmits information of a page which the user is reading as information of position of the user in the content to the community server 100.

The community server 100 generates a community in which the user participates, on the basis of the information of the position provided from the user terminal 200, and provides a service such as communication in the community to the user through the user terminal 200. When the community server 100 causes the user of the user terminal 200 to newly participate in a community, the community server 100 notifies the user terminal 200 of the participation of the community and provides a community service to the user, through communication with the user terminal 200.

Hereinafter, the functional configurations of the community server 100 and the user terminal 200 will be described in detail. The content server 300 can adopt the same configuration as that of the server used to provide the content such as the electronic book, except for the function of providing the content associated information to the community server 100. Therefore, repeated explanation of the content server 300 will be omitted.

The content server 300 may not be an independent server as in the example illustrated in FIG. 1 and may be integrated with the community server 100. In this case, the community server 100 has a content providing unit to provide the content to the user terminal 200, in addition to structural elements to be described below.

(Community Server)

Referring to FIG. 2, the community server 100 includes a content associated information acquiring unit 110, a position information acquiring unit 120, a community setting unit 130, a community service providing unit 140, a database 150, and a communication unit 160. The community server 100 is realized by an information processing apparatus to be described below. The community server 100 may not be realized by a single device and may be realized by a set of functions provided by resources distributed on the network.

The content associated information acquiring unit 110 is realized by a central processing unit (CPU), a random access memory (RAM), and a read only memory (ROM) and acquires the content associated information provided by the content server 300 through the communication unit 160. As described above, in this embodiment, the content associated information includes information to identify the electronic book to be provided to the user terminal 200, information showing the number of pages in each electronic book, and information showing an amount of content in each page.

The position information acquiring unit 120 is realized by a CPU, a RAM, and a ROM and acquires the information of the position of the user in the content to be provided from the user terminal 20, through the communication unit 160. As described above, in this embodiment, the information of the position of the user in the content is information of a page of the electronic book which the user is reading using the user terminal 200.

The community setting unit 130 is realized by a CPU, a RAM, and a ROM and sets a community in which users whose positions in the content are close participate, on the basis of the content associated information provided from the content associated information acquiring unit 110 and the information of the position of the user in the content to be provided from the position information acquiring unit 120. In this embodiment, the community setting unit 130 divides the pages of the electronic book into a plurality of segments and causes the users whose pages provided as the information of the positions are included in the same segment to participate in the same community as the users whose positions in the content are close. The community setting unit 130 stores information of the produced community or information of the users who participate in the community as community setting information 151 in the database 150.

In this case, the community setting unit 130 may change a size of each segment according to the number of users who are reading the electronic book. In the case of the electronic book, the size of the smallest segment is one page and the size of the largest segment is one electronic book. The community setting unit 130 may adjust the size of each segment such that the number of users who participate in the community becomes the number suitable for communication in the community. An example of setting the community by the community setting unit 130 will be described below.

The community service providing unit 140 is realized by a CPU, a RAM, and a ROM and provides a service such as a communication service in each community, according to setting of the community by the community setting unit 130. The community service providing unit 140 provides a communication service such as a BBS or chatting in the community, receives a remark of the user through the communication unit 160, and transmits information of remarks of another user to the user through the communication unit 160. The community service providing unit 140 stores the information as the community associated information 153 in the database 150. When the user is caused to newly participate in a community, the community service providing unit 140 may notify the user terminal 200 of participation of the community. An example of the service that is provided by the community service providing unit 140 will be described below.

The database 150 is realized by a hard disk or a semiconductor memory and stores a variety of information such as the community setting information 151 or the community associated information 153, which is associated with processing of the community server 100.

The communication unit 160 is realized by various communication devices. The communication unit 160 performs communication with the user terminal 200 and the content server 300 and transmits and receives information regarding processing of the content associated information acquiring unit 110, the position information acquiring unit 120, and the community service providing unit 140.

(User Terminal)

Referring to FIG. 3, the user terminal 200 includes a content acquiring unit 210, a content output unit 220, a position information providing unit 230, a community associated information acquiring unit 240, a community associated information output unit 250, and a community associated information input unit 260. The user terminal 200 is realized by an information processing apparatus to be described below.

The content acquiring unit 210 is realized by a CPU, a RAM, and a ROM and accesses the sequential content. In this embodiment, the content is the electronic book and the access of the content acquiring unit 120 to the content is to acquire the data of the page of the electronic book which the user is reading. The content acquiring unit 210 may access the content server 300 through the communication unit 270 and acquire the data of the page or internally access the data of the electronic book to be downloaded collectively from the content server 300 and be stored in a storage (not illustrated in the drawings) of the user terminal 200 and acquire the data of the page which the user is reading.

The content output unit 220 is realized by various output devices and outputs the content provided from the content acquiring unit 210 to the user in a form of an image or a sound. The user views the image or hears the sound and uses the content. In this embodiment, because the content is the electronic book, the content output unit 220 is a display to display the page of the electronic book. For example, when a sound such as effect sound or background music (BGM) is added to the electronic book, the content output unit 220 may include a speaker.

The position information providing unit 230 is realized by a CPU, a RAM, and a ROM and provides the information of the position of the user in the content to the community server 100 through the communication unit 270. In this embodiment, because the content is the electronic book, the position information providing unit 230 provides the information of the page of the electronic book to be acquired by the content acquiring unit 210 and be read by the user as the information of the position of the user in the content to the community server 100.

The community associated information acquiring unit 240 is realized by a CPU, a RAM, and a ROM and acquires information to be associated with the communication service in the community set by the community server 100 through the communication unit 270. The information that is acquired by the community associated information acquiring unit 240 is for example, information of the remark of the user in the BBS or the chatting to be the community service provided in the community or information showing that the user is caused to newly participate in a community. As will be described below, the community associated information acquiring unit 240 may control the content acquiring unit 210 according to the information acquired from the community server 100 and cause the content acquiring unit 210 to synchronize the position of the user in the content with the position of another user.

The community associated information output unit 250 is realized by various output devices and outputs the information to be associated with the communication service in the community provided from the community associated information acquiring unit 240 to the user in a form of an image or a sound. For example, when the BBS or the chatting is provided as the communication service, the community associated information output unit 350 is a display to display a log of the BBS or the chatting. When sound chatting is provided as the communication service, the community associated information output unit 250 includes a speaker.

In this case, the content output unit 220 and the community associated information acquiring unit 250 may be integrated with each other and may be separated from each other. For example, when the user terminal 200 has a plurality of displays, one display may be used as the content output unit 220 and another display may be used as the community associated information output unit 250. By displaying the content and the community associated information with windows, respectively, or displaying the content and the community associated information to overlap each other, the content output unit 220 and the community associated information output unit 250 may be realized by a single display.

The community associated information input unit 260 is realized by various input devices. The community associated information input unit 260 receives an input from the user about information associated with the community in which the user participates and transmits the information to the community server 100 through the communication unit 270. For example, when the BBS or the chatting is provided as the communication service, the community associated information input unit 260 may include a keyboard to input a remark of the user in a form of a text, a mouse, a touch pad, or a microphone having a sound recognition function. When the sound chatting is provided as the communication service, the community associated information input unit 260 includes a microphone.

The communication unit 270 is realized by various communication devices. The communication unit 270 performs communication with the community server 100 and the content server 300 and transmits and receives information regarding processing of the content acquiring unit 210, the position information providing unit 230, the community associated information acquiring unit 240, and the community associated information input unit 260.

1-2. Provided Service

Next, an example of a service that is provided in the first embodiment of the present disclosure will be described with reference to FIG. 4. FIG. 4 is a diagram illustrating an example of display in the first embodiment of the present disclosure.

In the example illustrated in FIG. 4, the user terminal 200 is a tablet PC that has two displays. One display is used as the content output unit 220 and a content screen is displayed on one display. In this embodiment, because the content is the electronic book, a content screen 221 to display a page of the electronic book is displayed on the content output unit 220. In the example illustrated in FIG. 4, an eighteenth page that is a start page of a second chapter is displayed and is read by the user. The other display is used as the community associated information output unit 250 and a community screen 251 is displayed on the other display. In the example illustrated in FIG. 4, a community of users who are reading a first half of the second chapter of the electronic book is produced by the community server 100 and a log of chatting performed by the users who participate in the community "reader community@ second chapter first half-A" is displayed as the community screen 251.

In the example illustrated in FIG. 4, one display or both the displays are touch screen displays and the user displays an on screen keyboard on the display, inputs a text, and participates in the chatting. In this case, a touch pad that is provided on the display corresponds to the community associated information input unit 260.

According to the display of the user terminal 200 described above, the user can communicate with another user reading the same portion of the electronic book through the community screen 251, while reading the electronic book through the content screen 221.

1-3. Community Setting

Next, an example of community setting in the first embodiment of the present disclosure will be described with reference to FIGS. 5 to 7. FIGS. 5 to 7 are diagrams illustrating the example of the community setting in the first embodiment of the present disclosure.

In the following example, eight users A to H are reading portions of first to third chapters of a certain electronic book. A portion of the electronic book which each user is reading is shown as a position of a "page" on a coordinate axis. First, initial setting of the community by the community setting unit 130 will be described using the example of FIG. 5 and a change of the community setting when the position of the user changes as illustrated in FIGS. 6 and 7 will be described.

(Initial Setting)

In the example of FIG. 5, first, the community setting unit 130 divides the pages of the electronic book into segments, on the basis of the content associated information provided form the content server 300. The content setting unit 130 may consider content of each page when the pages are divided. In the example illustrated in FIG. 5, the community setting unit 130 divides the pages into "1 to 17 pages", "18 to 102 pages", and "103 to 121 pages", on the basis of chapter configurations of the first to third chapters provided as the content associated information.

The community setting unit 130 detects that the length of the segment of the second chapter is longer than those of the other chapters and attempts to further divide the segment. For example, if it is assumed that the content associated information includes information showing that there is a paragraph of the story development in a seventy-fifth page, the community setting unit 130 further divides the segment corresponding to the second chapter into two segments of "18 to 74 pages" and "75 to 102 pages", on the basis of the information. By the processing described above, the portions of the first to third chapters of the electronic book are divided into a segment seg1 corresponding to the first chapter, a segment seg2 corresponding to the first half of the second chapter, a segment seg3 corresponding to the second half of the second chapter, and a segment seg4 corresponding to the third chapter.

Next, the community setting unit 130 sorts the positions of the users in the content to be provided from the user terminals 200 of the users, that is, the pages of the electronic book which the users are reading into the segments seg1 to seg4. Thereby, the users are associated with the segments. In the example of FIG. 5, the users A and B who are reading the pages from the first page to the seventeenth page are associated with the segment seg1. Hereinafter, the users C, D, E, and F are associated with the segment seg2 and the users G and H are associated with the segment seg3, in the same manner as the above case.

Next, the community setting unit 130 produces a community in which the users associated with the same segment participate. In the example illustrated in FIG. 5, the community setting unit 130 produces a community com1-1 in which the users A and B associated with the segment seg1 participate. The community setting unit 130 produces a community com1-4 in which the users G and H associated with the segment seg3 participate. The community setting unit 130 does not have to produce a community, with respect to the segment seg4 with which no user is associated.

In this case, the community setting unit 130 may set the upper limit to the number of users participating in the community. When the number of users associated with the segment is more than the upper limit, the community setting unit 130 may produce a plurality of communities with respect to the same segment and sort the users into the communities. In order to simplify the description, in the example illustrated in FIG. 5, it is assumed that the maximum number of users participating in the community is limited to two (in actuality, the number may be two or more). The four users C, D, E, and F are associated with the segment seg2 and the number of users associated with the segment is more than the upper limit of the number of users that can participate in the community. Therefore, the community setting unit 130 produces two communities com1-2 and com1-3 with respect to the segment seg2 and sorts the users C and D and the users E and F into the community com1-2 and the community com1-3, respectively.

By the processing described above, the community setting unit 130 sets the communities com1-1 to com1-4 in which the users A to H participate. Thereby, a user can enjoy communication in the community with another user who is reading the same portion, while reading each portion of the electronic book, as described in the example of FIG. 4.

(Change 1 of Community Setting)

In the example of FIG. 6, the user B reads the electronic book until the eighteenth page and enters the new segment seg2. In addition, the user H reads the electronic book until a one hundred third page and enters the new segment seg4. The community setting unit 130 that has detected the change of the pages which the users B and H are reading on the basis of the information of the position of each user in the content to be acquired by the position information acquiring unit 120 sets the communities in which the users participate again.

With respect to the user B, the community setting unit 130 searches for communities that correspond to the segment seg2 which the user B has newly entered. The communities that correspond to the segment seg2 are two communities of the community com1-2 and the community 1-3. In the example illustrated in FIG. 6, the community setting unit 130 causes the user B to newly participate in the community com1-2. As such, the community setting unit 130 may change the community in which the user participates, when the position of the user in the content changes and is out of the boundary of the segment.

In this case, it can be determined (1) whether the community in which the user B participates is changed and (2) which of the plurality of communities com1-2 and com 1-3 corresponding to the same segment seg2 the user B is caused to participate in, according to various conditions.

First, the community setting unit 130 may consider a state of the original community com1-1 when the community in which the user B participates is changed, with respect to (1) whether the community in which the user B participates is changed. In the example illustrated in FIG. 6, when the user B does not participate in the community com1-1, the user that participates in the community com1-1 may be only the user A. In this case, the community setting unit 130 may determine not to change the community in which the user B participates.

The community setting unit 130 may consider a relationship between the users A and B who have participated in the original community com1-1. For example, when the users A and B are close friends and desire to participate in the same community even though the users A and B are reading slightly different portions, the community setting unit 130 may determine not to change the community in which the user B participates. In this case, as will be described below, the community setting unit 130 changes the community in which the user B participates and when the user A also enters the same segment seg2 thereafter, the community setting unit 130 may perform reservation setting for the community in which the user A participates in the future such that the user A can participate in the same community as that of the user B.

Next, the community setting unit 130 may consider the number of users in each community, with respect to (2) which of the plurality of communities com1-2 and com 1-3 corresponding to the same segment seg2 the user B is caused to participate in. In the example illustrated in FIG. 6, the number of users in the communities com1-2 and com 1-3 before the user B participates in the communities com1-2 and com1-3 is the same. However, when the number of users is different, the community setting unit 130 may cause the user B to participate in the community having the smaller number of users. The community setting unit 130 may determine the community in which the user participates, by considering an attribute such as ages of the users participating in the community, a sex ratio, and position information.

The community setting unit 130 may consider a relationship of the users participating in the communities com1-2 and com1-3 and the user B. For example, when the users B and C are close friends, the community setting unit 130 may preferentially select the community com1-2 in which the user C participates, as the community in which the user B is to participate. In this case, the users B and C do not have to be users who participate in the same community with respect to reading of the electronic book. For example, the users B and C may be users who participate in the same community with respect to reading of another electronic book or may be users who do not participate in the same community, but are in a friendly relationship in actuality.

With respect to the user H, the community setting unit 130 searches for a community that corresponds to the segment seg4 which the user H has newly entered. In the state of the initial setting in the example illustrated in FIG. 5, the community that corresponds to the segment seg4 is not produced. However, in the example illustrated in FIG. 6, the community setting unit 130 does not newly produce a community and sets the community com 1-4 in which the user H participates to the community corresponding to the two segments of the segments seg3 and seg4 again. As such, when the position of the user in the content changes and is out of the boundary of the segment, the community setting unit 130 may change the segment corresponding to the community in which the user participates.

In this case, it may be determined whether the community in which the user H participates is newly produced, according to various conditions, similar to the case of the user B described above. When the number of users who have entered a segment in which there is no community is small, for example, one, the community setting unit 130 may maintain the community up to then without producing a new community, to prevent the opportunity of communication of the user and other users from decreasing.

At this time, the community setting unit 130 may consider the content. For example, if the third chapter is a chapter that includes an unexpected story twist, and it can be anticipated from the content associated information that presence of a user who has read the third chapter in the same community as another user who has not read the chapter would cause the other user to lose interest in the electric book, the community setting user 130 may generate a new community corresponding to the segment seg4 and cause the user H to participate in the new community even if this makes the user H alone.

Similar to the case of the user B described above, the community setting unit 130 may consider a relationship of other users G and H that participate in the original community com1-4. For example, when the users G and H are close friends and desire to participate in the same community even though the users G and H are reading slightly different portions, the community setting unit 130 may maintain the community com1-4 without producing a new community.

As another example of the community setting performed by considering the friendly relationship of the users, the community setting unit 130 may lock the community com1-4 in which the users G and H in the friendly relationship participate and may perform setting to prevent other users from participating in the community. The community service providing unit 140 may compulsorily synchronize progressing of the content of the users G and H who participate in the community. In this case, when it is detected that the user G has entered a new page, through the position information acquiring unit 120, the community service providing unit 140 may transmit a page turning instruction to the community associated information acquiring unit 240 of the user terminal 200 of the user H, control the content acquiring unit 210, compulsorily turn the page of the user H, and synchronize progressing of the content of the user H with progressing of the content of the user G.

(Change 2 of Community Setting)

In the example of FIG. 7, the user A reads the electronic book until the eighteenth page and enters the new segment seg2, following the user B. In addition, the user G reads the electronic book until a one hundred third page and enters the new segment seg4, following the user H. The community setting unit 130 that has detected the change of the pages which the users A and G are reading re-sets the communities in which the users participate.

With respect to the user A, the community setting unit 130 searches for communities that correspond to the segment seg2 which the user B has newly entered, similar to the case of the user B described above. In this case, when the users A and B are close friends and desire to participate in the same community, the community setting unit 130 may preferentially select the community com1-2 in which the user B participates as the community in which the user A participates. The community setting unit 130 may erase the community com1-1 in which there is no participated user due to the change of the community in which the user A participates. In this case, when the user newly reads the electronic book from the first page, a community corresponding to the segment seg1 is produced again.

With respect to the user G, the community setting unit 130 changes the community com1-4 from the community corresponding to both the segments seg3 and seg4 to the community corresponding to only the segment seg4, in a state in which the community setting unit 130 causes the user G to participate in the community com1-4 continuously. When the position of the user in the content changes and is out of the boundary of the segment, the community setting unit 130 changes the segment corresponding to the community in which the user participates. As a result, although the community 1-4 is the community corresponding to the segment seg3 in FIG. 5, the community 1-4 changes to the community corresponding to both the segments seg3 and seg4 in FIG. 6 and changes to the community corresponding to the segment seg4 in FIG. 7.

As such, when the positions, in the content, of the users participating in the community progress at approximately the same speed, the community setting unit 130 may change the corresponding segment of the community while maintaining the community. Thereby, if content progressing speeds of members of the community are almost the same, the user can continuously enjoy communication with the same members, even though the content progresses.

1-4. Processing Flow

Next, an example of a processing flow in the first embodiment of the present disclosure will be described with reference to FIG. 8. FIG. 8 is a flowchart illustrating an example of processing in the first embodiment of the present disclosure.

The flowchart of FIG. 8 illustrates processing executed by the position information acquiring unit 120 and the community setting unit 130 of the community server 100, with respect to each user. In this case, it is assumed that the content associated information is acquired previously by the content associated information acquiring unit 110 and is provided to the community setting unit 130.

First, the position information acquiring unit 120 acquires information of the page of the electronic book which the user is reading (step S101). As described above, in this embodiment, the information of the page of the electronic book which the user is reading is the information of the position of the user in the content.

Next, the community setting unit 130 determines whether the user has entered a new segment (step S103). The community setting unit 130 compares the information of the page which the user is reading, which is obtained in step S101, with the information of the divided segments of the pages of the electronic book based on the previously acquired content associated information, and determines whether the user has entered the new segment.

When it is determined in step S103 that the user has not entered the new segment, the processing returns to step S101 and information of the page which the user is reading is acquired again. Meanwhile, when it is determined in step S103 that the user has entered the new segment, the community setting unit 130 acquires the community setting information 151 with respect to the new segment which the user has entered (step S105). In this case, the community setting information 151 includes information of the produced communities and information of the users participating in each community and is stored in the database 150. In the examples of FIGS. 5 to 7, the information of the communities com1-1 to com1-4 and the information of the users A to H participating in the communities are the community setting information 151.

Next, the community setting unit 130 determines whether there is already a community with respect to the new segment which the user has entered, on the basis of the community setting information 151 (step S107). The case in which it is determined that there is already a community corresponds to the case of the user B of FIG. 6 or the case of the users A and G of FIG. 7. The case in which it is determined that there is not the community corresponds to the case of the user H of FIG. 6.

When it is not determined in step S107 that there is already a community, that is, when there is no community with respect to the new segment which the user has entered, the community setting unit 130 determines whether it is appropriate to cause the user to continuously participate in the community up to then (step S109). The case in which it is determined that it is appropriate to cause the user to continuously participate in the community up to then is a case in which the user and another user of the community are in a friendly relationship or a case in which there is not much inconvenience even if the community ranges over segments, in terms of the contents, as described in the case of the user H of FIG. 6.

When it is determined in step S109 that it is appropriate to cause the user to continuously participate in the community up to then, the community setting unit 130 causes the user to continuously participate in the community up to then (step S111). In this case, the community in which the user has participated becomes a community corresponding to the plurality of segments, like the community com1-4 of FIG. 6.

Meanwhile, when it is determined in step S109 that it is not appropriate to cause the user to continuously participate in the community up to then, the community setting unit 130 newly produces a community and causes the user to participate in the community (step S113).

When it is determined in step S107 that there is already the community with respect to the new segment which the user has entered, the community setting unit 130 determines whether there are a plurality of communities with respect to the segment, on the basis of the community setting information 151 (step S115). In this case, when it is determined that there are not the plurality of communities, that is, when there is only one community with respect to the segment, the community setting unit 130 causes the user to continuously participate in one existing community (step S117). Additionally, it may be determined whether the number of users in the community when the user participates in the community is more than the upper limit and the community may be divided when the number of users is more than the upper limit.

Meanwhile, when it is determined in step S115 that there are the plurality of communities, the community setting unit 130 starts processing for selecting the community in which the user participates. In the example illustrated in the drawings, the community in which another user who has participated in the same community as the user in the past participates is preferentially selected as the community in which the user is to participate. The community setting unit 130 searches for another user who has participated in the same community as the user in the past (step S119) and causes the user to participate in the community in which the other user participates (step S121).

In this case, when there are no other users who have participated in the same community as the user in the past, the community setting unit 130 randomly selects the community in which the user newly participates. When there are a plurality of other users who have participated in the same community as the user in the past and each of the users participates in a different community, the community setting unit 130 may select a community in which many of the other users who have participated in the same community as the user in the past participate. As described in the above example, the community in which the number of participating users is small may be preferentially selected and the community may be selected on the basis of a relationship such as a friendly relationship set between the users, separately from the community participation.

1-5. Display of Table of Contents

Next, an example of a table of contents to be additionally displayed in the first embodiment of the present disclosure will be described with reference to FIG. 9. FIG. 9 is a diagram illustrating an example of display of a table of contents in the first embodiment of the present disclosure.

In the example illustrated in FIG. 9, the user terminal 200 is the same tablet PC as that illustrated in FIG. 4. As illustrated in FIG. 9, when the table of contents is displayed, both the displays may be used as the community associated information output unit 250 and a table of contents screen 253 may be displayed. Similar to the example of FIG. 4, one display may be used as the content output unit 220 and the content screen 221 may be displayed on one display and the other display may be used as the content associated information output unit 250 and the table of contents screen 253 may be displayed on the other display.

In the example illustrated in FIG. 9, the table of contents screen 253 includes a table of contents screen 253a to display titles of a plurality of electronic books as "magazines of the week" and a table of contents screen 253b to display content of an electronic book selected from the electronic books displayed on the table of contents screen 253a by an operation from the user. Data to display the table of contents screen 253 is generated by the community service providing unit 140 of the community server 100 with reference to the community setting information 151 stored in the database 150 and is transmitted to the user terminal 200 through the communication unit 160.

On the table of contents screen 253a, the titles of the plurality of electronic books and the number of users participating in a community produced with respect to each electronic book are displayed. Meanwhile, on the table of contents screen 253b, the number of users that participate in a community produced with respect to each of segments of the selected electronic book is displayed. In the example illustrated in FIG. 9, because the electronic book is the magazine, a community is produced with respect to each of segments corresponding to articles such as "special edition", "serialization", and "fortune of this week".

In this case, each article may be divided into a plurality of segments according to the number of pages. When there are a plurality of users in a segment (for example, in the case of a segment of a "special edition" article in which there are 11635 users), a plurality of communities may be produced with respect to the same segment such that the number of users in the communities becomes a number suitable for communication. On the table of contents screen 253, the number of users who participate in the communities produced as described above may be added up for each divided part of the content recognized by the user, such as the article of the magazine, and may be displayed.

By displaying the table of contents screen 253, the user can discover an article becoming a topic of communication between more users, start to read the electronic book from the article, and read the electronic book while communicating with more users actively. If the display like the table of contents screen 253 is provided to a publishing company which publishes the electronic book, the publishing company can know which part of which electronic book becomes the topic of the communication between more users and can use the corresponding information in future making of a plane of paper. If the same display is provided to a company which puts an advertisement in the electronic book such as the magazine, the company can know how an advertisement is read by readers of the electronic book and can use the corresponding information in future advertisement development.

1-6. Summary of First Embodiment

The first embodiment of the present disclosure has been described. In this embodiment, the page which the user is reading is acquired as the information of the position of the user in the content with respect to the electronic book to be the example of the sequential content, the community in which the users who are reading close pages participate is produced, and the communication place is provided to the user.

In this case, the pages may be divided into a plurality of segments using the pages included in the electronic book and information of content of each page, to know "users who are reading close pages". In this case, the users who are reading the pages included in the same segment participate in the same community. As described above, when the length of the content of the electronic book is short, the number of readers is small, or the content is not content such as a novel in which the user can enjoy the story development, a community using the entire electronic book as one segment may be produced. For example, when the number of readers of the electronic book is large, a community using each page as one segment may be produced.

The upper limit may be set to the number of users participating in the community, in consideration of the number of users in which communication can be easily performed. When the number of users participating in the community is more than the upper limit, the community may be divided and a plurality of communities may be produced to overlap, with respect to the same segment. In this way, when there are a plurality of communities, a community in which the user who has newly entered a segment participates may be determined by considering the number of users participating in each community or a relationship between the users participating in each community and the new users.

A segment that is associated with the community may be fixed and may change according to the change of the position of the user participating in the community in the content. When the segment associated with the community is fixed, if the position of the user is out of the boundary of the segment, the user automatically moves to a new community. Such a configuration is suitable for an electronic book such as a magazine in which the number of readers is large and association of content of each page is low. When the segment associated with the community changes, the user can read the electronic book while maintaining communication with other users participating in the same community. Such a configuration is suitable for an electronic book such as a novel in which the number of readers is relatively small and association of content of each page is high. The two configurations may be used separately, according to a situation of a community corresponding to each segment, as described in the above examples.

A table of contents screen to display a situation of a community for each electronic book or each segment in the electronic book may be provided. Thereby, the user can select an electronic book or a segment in which communication can be actively performed and read the content.

2. Second Embodiment

Next, a second embodiment of the present disclosure will be described with reference to FIGS. 10 to 15. In the second embodiment, a user uses moving image content using a terminal device.

The moving image content is an example of sequential content that progresses with a reproduction time. The moving image content has been provided in the form of a movie to be watched at a movie theater and television broadcasting. In this case, all viewers have shared the progress of content in the same temporal order. At the present time, the moving image content is generally distributed through a network. As a result, users can view the moving image content at a desired time. That is, the progress of content in the different temporal order is enabled between the users.

From a viewpoint of the convenience of the user, such an evolution is preferable. Meanwhile, when the users view the moving image content distributed through the network, the progress of the content is different between the users, as described above. For this reason, it is difficult to perform communication between the users about impressions of the content in real time, like when the users have watched the movie at the movie theater or when television broadcasting is "broadcasted on the spot" by the BBS or the chatting.

However, in the case of the moving image content that is viewed by a number of users, even though each user individually views the content, consequently, there are a plurality of users viewing the content at the same timing. This embodiment provides a communication place between the users who share the progressing of the content potentially.

2-1. System Configuration

Because the system configuration according to the second embodiment is basically the same as the system configuration according to the first embodiment, repeated explanation thereof will be omitted. The second embodiment is different from the first embodiment in that the content is not the electronic book but the moving image content and the position of the user in the content is not the page but the reproduction time.

In this case, the moving image content may be streamed from a content server 300 to a user terminal 200 or the moving image content that is downloaded from the content sever 300 and is archived in the user terminal 200 may be reproduced. As another example, the moving image content may be stored in removable recording media and may be reproduced by the user terminal 200. In this case, the content server 300 may be a server that provides information necessary to specify the content to a community server 100 and does not perform communication with the user terminal 200.

2-2. Provided Service

Next, an example of a service provided in the second embodiment of the present disclosure will be described with reference to FIG. 10. FIG. 10 is a diagram illustrating an example of display in the second embodiment of the present disclosure.

In the example illustrated in FIG. 10, the user terminal 200 is a tablet PC that has one display. The display is shared by a content output unit 220 and a community associated information output unit 250 and each of a content screen 221 and a community screen 251 is displayed as a window. In the example illustrated in FIG. 10, a community of users who view a portion (a reproduction time is 01:48:33) of the moving image content is produced by the community server 100 and a log of chatting by the users who participate in the community "viewer community@1:48:33" is displayed as the community screen 251.

In the example illustrated in FIG. 10, the display is a touch screen display and the user displays an on screen keyboard on the display, inputs a text, and participates in the chatting. In this case, a touch pad that is provided on the display corresponds to a community associated information input unit 260.

According to the display of the user terminal 200, the user can communicate with other users viewing the same portion of the moving image content through the community screen 251, while viewing the moving image content through a content screen 221.

2-3. Community Setting

Next, examples of community setting in the second embodiment of the present disclosure will be described with reference to FIGS. 11 to 13. FIGS. 11 to 13 are diagrams illustrating the examples of the community setting in the second embodiment of the present disclosure.

In the following examples, seven users A to G are viewing certain moving image content. A portion of the moving image content which each user is viewing is shown as a position of a "reproduction time" on a coordinate axis. With respect to each user, the content progresses equally along the coordinate axis of the "reproduction time" to be a time axis, as long as the reproduction is not stopped. In this case, first, initial setting of the community by the community setting unit 130 will be described using the example of FIG. 11 and a change of the community setting when the position of the user changes as illustrated in FIGS. 12 and 13 will be described.

(Initial Setting)

In the example of FIG. 11, the community setting unit 130 sets a community in which the user participates, on the basis of the position of the user in the content to be provided from the user terminal 200 of each user, that is, the reproduction time at which the user is viewing the moving image content. In the example of FIG. 11, a community com2-1 in which the users A and B who have started viewing of the moving image content at a reproduction time 0:00:00 participate, a community com2-2 in which the users C, D, and E who are viewing the moving image content at a reproduction time 0:15:32 participate, and a community com2-3 in which the users F and G who are viewing the moving image content at a reproduction time 0:48:46 participate are set.

Similar to the first embodiment, the community setting unit 130 may set the upper limit to the number of users who participate in a community and may produce a plurality of communities with respect to the same reproduction time and sort the users into the communities, when the number of users viewing the moving image content at the same reproduction time is more than the upper limit.

By the processing described above, the community setting unit 130 sets the communities com2-1 to com2-3 in which the users A to G participate. Thereby, the user can enjoy communication in the community with another user who are viewing the same portion, while viewing each portion of the moving image content, as described in the example of FIG. 10.

(Change of Community Setting)

In this embodiment, because the content progresses at the same speed with respect to each user, the change in the community setting due to the difference in degrees of progress between the users is not caused. The case in which the community setting changes corresponds to the case in which the user temporarily stops viewing of the content by circumstances or the case in which streaming of the content to the user is interrupted by a state of a line.

In the example of FIG. 12, viewing of the content of the user C is temporarily stopped or interrupted at about a reproduction time 0:15:32 by the circumstances. Meanwhile, the six users A, B, and D to G are viewing the moving image content continuously. By progressing of the content with respect to each user, corresponding reproduction times of the communities com2-1 to 2-3 are advanced by 12 minutes 12 seconds from the situation of FIG. 11.

At this time, the community setting unit 130 causes the user C to withdraw from the community com2-2 and causes the user C to enter a community non-participation state. This reason is as follows. If the user C restarts viewing of the content thereafter in a state in which the user C participates in the community com2-2, it may be difficult to perform communication between the user C and other users, because progressing of the content is different between the user C and other users. However, similar to the case of the first embodiment, when the user C and the users D and E are in a friendly relationship and consent that the users participate in the same community even though the progressing of the content is different, the participation of the user C in the community com2-2 may be maintained.

In the example of FIG. 13, the user C returns from the stopped or interrupted state and restarts viewing of the content. Meanwhile, the six users A, B, and D to G are viewing the moving image content continuously. By progressing of the content with respect to each user, corresponding reproduction times of the communities com2-1 to 2-3 are advanced by 3 minutes 0 second from the situation of FIG. 12.

At this time, the community setting unit 130 searches for a community in which the user C who has restarted viewing of the moving image content is caused to participate. Specifically, the community setting unit 130 searches for a community that corresponds to about a reproduction time 0:15:32 when the user C restarts viewing of the moving image content. In the example illustrated in FIG. 13, there is the community com2-1 in which the users A and B who are viewing the moving image content at a reproduction time 0:15:12 shortly before the reproduction time 0:15:32 participate. The community setting unit 130 determines to cause the user C to newly participate in the community com2-1.

For example, like the case of the user C in the example illustrated in FIG. 13, when the user restarts viewing of the interrupted moving image content, there may not be other users who are viewing the moving image content at the same reproduction time. In this case, the community setting unit 130 widens a range of the reproduction time to a reproduction time near the reproduction time 0:15:32 of the user C, searches for a community, and discovers the community com2-1. For example, the range of the reproduction time to search for the community may be limited to a range of the reproduction time before the reproduction time of the user C, to prevent a non-viewed portion from existing in the content. When the community in which the user participates changes as described above and the corresponding reproduction time of the community is different from the reproduction time at which the user restarts viewing of the moving image content, the community associated information acquiring unit 240 of the user terminal 200 may synchronize the reproduction time at which the user views the moving image content with the corresponding reproduction time of the community, through the content acquiring unit 210. Thereby, in the example illustrated in FIG. 13, the reproduction time at which the user C views the moving image content is retreated by 20 seconds from 0:15:32 to 0:15:12.

2-4. Synchronization Setting

Next, synchronization setting in the second embodiment of the present disclosure will be described with reference to FIG. 14. FIG. 14 is a diagram illustrating an example of synchronization setting display in the second embodiment of the present disclosure.

In an example illustrated in FIG. 14, the user terminal 200 is the same tablet PC as that illustrated in FIG. 10. The display is shared by the content output unit 220 and the community associated information output unit 250. In the example illustrated in FIG. 14, a message notifying that loading of the moving image content has been completed and a reproduction preparation has been completed is displayed on the content screen 221. Meanwhile, a message notifying that there are other users who are attempting to start viewing of the moving image content and a button to select whether or not to perform synchronization with the other users are displayed on the community screen 255.

In this case, when the user selects to perform synchronization with the other users through the community associated information input unit 260, that is, a touch pad provided in the display, the community setting unit 130 of the community server 100 that has received corresponding information causes the user to participate in a community in which a reproduction time is 0:00:00 and maintains a waiting state until messages notifying that a content viewing preparation has been completed are received from the user terminals 200 of the other users. If the content viewing preparations of the other users are completed, the community service providing unit 140 notifies the community associated information acquiring unit 240 of the user terminal 200 that starting of viewing of the users who participate in the community is enabled. The content acquiring unit 210 starts to access the content, according to information from the community associated information acquiring unit 240 that has received the notification.

Meanwhile, when the user selects not to perform synchronization with the other users, the content acquiring unit 210 immediately starts to access the content. When there is another user who has started viewing of the content at the same time as a time at which the user has started viewing of the content, the community setting unit 130 of the community server 100 causes the user to participate in the same community as the community of the other user. However, when there are no other users, the community setting unit 130 causes the user not to participate in a community.

As such, for example, when viewing of the moving image content starts, viewing start timing of the user is synchronized with viewing start timing of another user who is preparing for the viewing start, so that a community of users who are viewing the moving image content at the same reproduction time can be easily produced and the opportunity of providing a communication place to the user can be increased. As described in the above example, it may be determined whether or not to perform viewing timing synchronization with another user, by the selection of the user. When the predetermine upper limit is set to the waiting time of the user and viewing timing synchronization with other users can be performed in a range of the waiting time, the viewing timing synchronization may be automatically performed.

The difference of the reproduction times may be allowed between reproduction times of the users who participate in the same community to increase the opportunity of providing a communication place to the user. For example, the community setting unit 130 may cause the users whose difference of the reproduction times is within five seconds to participate in the same community. For example, when communication in the community is performed using a text based on the BBS or chatting, the community setting unit 130 may allow the difference of the reproduction times of a relatively long time, by considering a time lag generated when the text is input using the community associated information input unit 260. Meanwhile, when the communication in the community is performed using sound chatting, the community setting unit 130 may allow only the difference of the reproduction times of a short time, such that communication can be performed in real time.

The synchronization of content viewing start timings between the users is applicable to the case in which viewing start timing of the content of the user is controlled by the intention of the content providing side. For example, when a movie releases and shows on a network, content viewing start timing in the user terminal 200 of each user may be synchronized such that content viewing starts from a showing start time set by a content provider.

2-5. Processing Flow

Next, an example of a processing flow in the second embodiment of the present disclosure will be described with reference to FIG. 15. FIG. 15 is a flowchart illustrating an example of processing in the second embodiment of the present disclosure.

The flowchart of FIG. 15 illustrates processing that is executed by the position information acquiring unit 120 and the community setting unit 130 of the community server 100 when each user starts or restarts viewing of content. In this case, it is assumed that the content associated information is acquired previously by the content associated information acquiring unit 110 and is provided to the community setting unit 130.

First, the position information acquiring unit 120 acquires information of the reproduction time at which the user starts viewing of the content (step S201). As described above, in this embodiment, the content is the moving image content and the information of the position of the user in the content is information of the reproduction time at which the user is viewing the content.

Next, the community setting unit 130 acquires the community setting information 151, with respect to the reproduction time near the reproduction time at which the user starts viewing of the content (step S203). In this case, the content setting information 151 includes information of the produced communities and information of a user who participates in each community and is stored in the database 150. In the examples of FIGS. 11 to 13, the information of the communities com2-1 to com2-3 and the information of the users A to G who participate in the communities are the community setting information 151. As described above, the searched communities may be limited to the communities corresponding to the reproduction time before the reproduction time at which the user starts viewing of the content.

Next, the community setting unit 130 determines whether there is already a community at the reproduction time near the reproduction time of the user, on the basis of the community setting information 151 (step S205). In this case, when it is determined that there is already the community, the community setting unit 130 executes the processing of steps S115 to S121 equal to those of FIG. 8.

Meanwhile, when it is determined in step S205 that there is not the community at the reproduction time near the reproduction time of the user, the community setting unit 130 determines whether there is another user who is preparing for viewing the content at the reproduction time near the reproduction time of the user (step S207). In order to perform the determination, the content acquiring unit 210 of the user terminal 200 may be set to notify the community server 100 that viewing of the content is being prepared.

When it is determined in step S207 that there is another user who is preparing for viewing the content at the reproduction time near the reproduction time of the user, the community setting unit 130 sends an inquiry illustrated in FIG. 14 to the user through the community associated information acquiring unit 240 of the user terminal 200 and waits for the other user according to an instruction from the user responding to the inquiry (step S209) and produces a new community in which the user and the other user participates (step S211).

Meanwhile, when it is determined in step S207 that there are no other users who are preparing for viewing the content at the reproduction time near the reproduction time of the user, the community setting unit 130 ends the processing without causing the user to participate in the community.

2-6. Summary of Second Embodiment

The second embodiment of the present disclosure has been described. In this embodiment, with respect to the moving image content to be the example of the sequential content, the reproduction time at which the user is viewing the content is acquired as the position of the user in the content, a community in which users who are viewing the content at the near reproduction time or the same reproduction time participate is produced, and a communication place is provided to the users.

Similar to the first embodiment, even in this embodiment, the upper limit may be set to the number of users who participate in the community. When the number of users participating in the community is more than the upper limit, the community may be divided and the plurality of communities may be produced to overlap, with respect to the same reproduction time. In this way, when there are the plurality of communities, a community in which a user who newly start viewing of the content at the reproduction time participates may be determined by considering the number of users participating in each community or a relationship between the user participating in each community and the new user.

In this embodiment, the reproduction time that is associated with the community changes every moment, different from the first embodiment. This is because the content progressing speed of each user is basically the same in the moving image content. Therefore, when the user interrupts viewing of the content by a certain reason, the user temporarily enters a community non-participation state and the user may be newly sorted into a community corresponding to the near reproduction time, when the user restarts viewing of the content. At this time, the community into which the user is newly sorted may be limited to a community corresponding to the reproduction time before the reproduction time at which the user restarts viewing of the content.

In order to enable the user to easily participate in the community, the predetermined reproduction time difference may be allowed between the reproduction times of the users who participate in the same community. When the user starts or restarts viewing of the content, the content viewing timing of another user who is preparing for viewing of the content at the near reproduction time and the content viewing timing of the user may be synchronized with each other by the selection of the user or automatically.

3. Summary (Hardware Configuration)

Next, a hardware configuration of an information processing apparatus 900 that can realize the community server 100, the user terminal 200, and the content server 300 according to the embodiments of the present disclosure will be described with reference to FIG. 16. FIG. 16 is a block diagram illustrating a hardware configuration of an information processing apparatus.

The information processing device 900 includes a CPU 901, ROM 903, and RAM 905. Further, the information processing device 900 may include a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control unit, and controls the entire operation within the information processing device 900 or a part thereof in accordance with various programs recorded on the ROM 903, the RAM 905, the storage 919, or the removable recording medium 927. The ROM 903 stores programs, operation parameters, and the like used by the CPU 901. The RAM 905 temporarily stores programs used in the execution of the CPU 901, parameters that change as appropriate during the execution, and the like. The CPU 901, the ROM 903, and the RAM 905 are mutually connected by a host bus 907 constructed from an internal bus such as a CPU bus. Further, the host bus 907 is connected to the external bus 911 such as a PCI (Peripheral Component Interconnect/Interface) via the bridge 909.

The input device 915 is a device used by a user such as, for example, a mouse, a keyboard, a touch panel, a button, a switch, or a lever. The input device 915 may be, for example, a remote control device that uses infrared rays or other radio waves, or an external connection device 929 such as a portable phone corresponding to the operation of the information processing device 900. The input device 915 includes an input control circuit that generates an input signal based on information input by a user and outputs the input signal to the CPU 901. The user can, by operating the input device 915, input various data to the information processing device 900 or instruct the information processing device 900 to perform a processing operation.

The output device 917 includes a device that can visually or audibly inform a user of the acquired information. The output device 917 can be, for example, a display device such as an LCD (liquid crystal display), a PDP (Plasma Display Panel,) an organic EL (Electro-Luminescence) display; an audio output device such as a speaker or headphones; or a printer device. The output device 917 outputs the result obtained through the processing of the information processing device 900 as text or video such as an image or as sound such as voice or audio.

The storage device 919 is a device for storing data, constructed as an example of a storage unit of the information processing device 900. The storage device 919 includes, for example, a magnetic storage device such as HDD (Hard Disk Drive), a semiconductor storage device, an optical storage device, or a magneto-optical storage device. This storage device 929 includes, for example, programs or various data executed by the CPU 901 or various data acquired from the outside.

The drive 921 is a reader/writer for a removable recording medium 927 such as a magnetic disk, an optical disc, a magneto-optical disk, or semiconductor memory, and is incorporated in or externally attached to the information processing device 900. The drive 921 reads information recorded on a removable recording medium 927 that is mounted, and outputs the information to the RAM 905. The drive 921 also writes information to the removable recording medium 927 that is mounted.

The connection port 923 is a port for directly connecting a device to the information processing device 900. The connection port 923 can be, for example, a USB (Universal Serial Bus) port, an IEEE 1394 port, or a SCSI (Small Computer System Interface) port. In addition, the connection port 923 may be an RS-232 port, an optical audio terminal, or a HDMI (High-Definition Multimedia Interface) port. When the external connection device 929 is connected to the connection port 923, the information processing device 900 and the external connection device 929 can exchange various data.

The communication device 925 is, for example, a communication interface including a communication device or the like for connection to a communications network 931. The communication device 925 can be, for example, a wired or wireless LAN (Local Area Network) or a communication card for Bluetooth (registered trademark) or WUSB (Wireless USB). Alternatively, the communication device 925 may be a router for optical communication, a router for ADSL (Asymmetric Digital Subscriber Line), or a modem for various communication. The communication device 925 transmits or receives signals or the like via the Internet or to/from other communication devices, for example, using a predetermined protocol such as TCP/IP. In addition, the communications network 931 connected to the communication device 925 is a network connected by wire or wirelessly, and is, for example, the Internet, a home LAN, infrared communication, radio wave communication, or satellite communication.

An exemplary hardware configuration of the information processing device 900 has been described above. Each of the aforementioned components may be configured using general members or specialized hardware for the function of each component. Such a configuration can be changed as appropriate according to the technology level in implementation.

(Remarks)

The embodiments in which the user terminals are the tablet PCs have been described. However, as described above, the user terminals may be various devices such as a notebook PC, a desktop PC, a mobile phone, a smart phone, a PDA, and various media players, which can provide content to the user. In the above description, the number of displays that are included in the user terminal is one or two. However, the present disclosure is not limited thereto. In addition, the output form of the content and the community associated information is not limited to the image and may be a sound. Therefore, the user terminal may not have the display.

The embodiments in which the content provided to the user is the electronic book or the moving image content have been described. However, in the present disclosure, any content may be used as long as the content provided to the user is the sequential content, similar to the electronic book or the moving image content.

The embodiments in which the user who uses the content is automatically sorted into the community and the communication service in the community is provided to the user have been described. However, the participation of the user in the community and the provision of the communication service to the user may be performed after confirmation from the user. For example, in the case of the electronic book, communities that correspond to different sizes such as a unit of book, a unit of chapter, and a unit of page may be produced and the user may select the unit of the community in which the user participates.

The embodiments in which the position information such as the page or the time stamp of the reproduction time is set previously to the content have been described. However, the embodiments of the present disclosure are applicable to the case in which position information is not set previously to content, like package content possessed by the user or content ripped in a hard disk by the user. In this case, software to add the position information to the content or a service for downloading data of the position information prepared for each content may be provided.

It should be understood by those skilled in the art that various modifications, combinations, sub-combinations and alterations may occur depending on design requirements and other factors insofar as they are within the scope of the appended claims or the equivalents thereof.

Additionally, the following configurations are also within the technical scope of the present disclosure.

(1) An information processing system including at least one control unit to designate a user-access position within sequential content at which a user accesses the sequential content, and to associate the user with other users who each access the sequential content at a position that is the same, or close to, the user-access position.

(2) The system according to (1), wherein the at least one control unit includes at least two control units, a first control unit located in a user terminal and operable to designate a user-access position within sequential content, and a second control unit located in a server and operable to associate the user with other users who each access the sequential content at a position that is the same, or close to, the user-access position.

(3) The system according to (2), wherein the sequential content is stored in the user terminal.

(4) The system according to (2), wherein the sequential content is provided to the user terminal from the server.

(5) The system according to (2), further including a content server, and wherein the sequential content is provided to the user terminal from the content server.

(6) The system according to (2), wherein the server comprises a plurality of devices at respective locations.

(7) The system according to (1), further including a display, and wherein the display simultaneously displays the sequential content and an interface for the user to communicate with the other users.

(8) The system according to (1), wherein the sequential content is partitioned into a plurality of segments, and the user and the other users are associated with one of the segments.

(9) The system according to (8), wherein the size of each segment is determined according to a total number of users.

(10) The system according to (8), wherein the user and the other users are associated in a community.

(11) The system according to (10), wherein the community is associated with the one of the segments, and wherein when the total number of the user and the other users exceeds an upper limit, the user and the other users are partitioned into a plurality of communities and the plurality of communities is associated with the one of the segments.

(12) The system according to (1), wherein when the user is associated with the other users, the system notifies the user of the association.

(13) The system according to (1), wherein the sequential content is an electronic book.

(14) The system according to (1), wherein when the user is associated with a first community including the user and first other users and the user-access position changes, the user becomes associated with a second community including the user and second other users, the second other users being different from the first other users.

(15) The system according to (1), wherein the association of the user and the other users is further based on a relationship between the user and one or more of the other users.

(16) The system according to (15), wherein the relationship is one of close friendship.

(17) The system according to (1), wherein the association of the user and the other users is further based on an age of the user and an age of one or more of the other users.

(18) The system according to (1), wherein the sequential content is moving image content and the system synchronizes the user-access position with an access-position of the other users.

(19) The system according to (1), wherein the sequential content is moving image content and access-positions of the other users are each earlier than the user-access position.

(20) The system according to (1), further including a display, wherein the sequential content is moving image content, and wherein when the user requests viewing of the moving image content and the other users request viewing of the moving image content, the display displays to the user a message indicating that the other users have requested viewing of moving image content and a button for initiating synchronization of the user with the other users.

(21) An information processing method including: designating a user-access position within sequential content at which a user accesses the sequential content; and associating the user with other users who each access the sequential content at a position that is the same, or close to, the user-access position.

(22) A non-transitory computer-readable medium having stored thereon a computer-readable program for implementing an information processing method, the method including: designating a user-access position within sequential content at which a user accesses the sequential content; and associating the user with other users who each access the sequential content at a position that is the same, or close to, the user-access position.

(23) An information processing apparatus through which a user can access sequential content, including: a communication unit for receiving information related to other users who each access the sequential content at a position within the sequential content that is the same, or close to, a user-access position within the sequential content; and a display to simultaneously display the sequential content and an interface for the user to communicate with the other users.

(24) The apparatus according to (23), wherein the sequential content is moving image content, and wherein when the user requests viewing of the moving image content and the other users request viewing of the moving image content, the display displays to the user a message indicating that the other users have requested viewing of moving image content and a button for initiating synchronization of the user with the other users.

REFERENCE SIGNS LIST

100 Community server
110 Content associated information acquiring unit
120 Position information acquiring unit
130 Community setting unit
140 Community service providing unit
150 Database
160 Communication unit
200 User terminal
210 Content acquiring unit
220 Content output unit
230 Position information providing unit
240 Community associated information acquiring unit
250 Community associated information output unit
260 Community associated information input unit
270 Communication unit
300 Content server
seg Segment
com Community

The invention claimed is:

1. An information processing system, comprising:
at least one circuitry configured to:
    divide a sequential content item of a plurality of sequential content items into a first plurality of segments;
    acquire user-access position data within a first segment of the first plurality of segments of the sequential content item,
        wherein the user-access position data indicates a first position at which a first terminal associated with a first user of a plurality of users accesses the sequential content item;
    detect a length of a second segment of the first plurality of segments is longer than remaining segments of the first plurality of segments, based on content information of the sequential content item;
    divide the second segment into a second plurality of segments based on the detection;
    identify a second terminal associated with a second user of the plurality of users, wherein
        the first user and the second user are associated with a first representation of a first community, and
        the first representation of the first community is associated with the first segment of the first plurality of segments;
    determine whether the first user should participate in the first community, based on the association of the first user and the second user with the first representation of the first community;
    create a first representation of a second community based on the division of the second segment;
    disassociate the first user from the first representation of the first community, based on the determination that the first user should not participate in the first community;
    associate the first user with the first representation of the second community, subsequent to the disassociation;
    provide a network communication service to communicate between the first terminal and the second terminal;
    display, on a display screen of the first terminal, a first table of contents that indicates titles of the plurality of sequential content items; and
    display, on the display screen of the first terminal, a second table of contents that indicates a number of the plurality of users associated with each of the first plurality of segments.

2. The information processing system as recited in claim 1, wherein the at least one circuitry is further configured to:
associate the first user with a third user of the plurality of users, wherein the third user is associated with a second position within the first segment of the first plurality of segments; and provide the network communication service to communicate between the first terminal and a third terminal associated with the third user.

3. The information processing system as recited in claim 1, wherein
the at least one circuitry is further configured to notify the first user regarding the second user, and
the notification is prior to the communication between the first terminal and the second terminal.

4. The information processing system as recited in claim 1, wherein the sequential content item is an electronic book.

5. The information processing system as recited in claim 3, wherein the association of the first user and the second user with the first representation of the first community is based on ages of a number of the plurality of users that participates in the first community.

6. The information processing system as recited in claim 1, wherein
the sequential content item is a moving image content item, and
based on a request of the first user to view the moving image content item and a request of the second user to view the moving image content item, the at least one circuitry is further configured to control the display screen of the first terminal to display:
a message that indicates the second user has requested to view the moving image content item, and
a button to initiate synchronization, of a start time, of the moving image content item for the first user with the second user.

7. An information processing method, comprising:
dividing a sequential content item of a plurality of sequential content items into a first plurality of segments;
acquiring user-access position data within a first segment of the first plurality of segments of the sequential content item,
wherein the user-access position data indicates a first position at which a first terminal associated with a first user of a plurality of users accesses the sequential content item;
detecting a length of a second segment of the first plurality of segments is longer than remaining segments of the first plurality of segments, based on content information of the sequential content item;
dividing the second segment into a second plurality of segments based on the detection;
identifying a second terminal associated with a second user of the plurality of users, wherein
the first user and the second user are associated with a first representation of a first community, and
the first representation of the first community is associated with the first segment of the first plurality of segments;
determining whether the first user should participate in the first community, based on the association of the first user and the second user with the first representation of the first community;
creating a first representation of a second community based on the division of the second segment;
disassociating the first user from the first representation of the first community, based on the determination that the first user should not participate in the first community;
associating the first user with the first representation of the second community, subsequent to the disassociation;
providing a network communication service to communicate between the first terminal and the second terminal; and
displaying, on a display screen of the first terminal, a first table of contents that indicates titles of the plurality of sequential content items; and
displaying, on the display screen of the first terminal, a second table of contents indicating a number of the plurality of users associated with each of the first plurality of segments.

8. A non-transitory computer-readable medium having stored thereon computer-executable instructions that, when executed by a processor, cause the processor to execute operations, the operations comprising:
dividing a sequential content item of a plurality of sequential content items into a first plurality of segments;
acquiring user-access position data within a first segment of the first plurality of segments of the sequential content item,
wherein the user-access position data indicates a first position at which a first terminal associated with a first user of a plurality of users accesses the sequential content item;
detecting a length of a second segment of the first plurality of segments is longer than remaining segments of the first plurality of segments, based on content information of the sequential content item;
dividing the second segment into a second plurality of segments based on the detection;
identifying a second terminal associated with a second user of the plurality of users, wherein
the first user and the second user are associated with a first representation of a first community, and
the first representation of the first community is associated with the first segment of the first plurality of segments;
determining whether the first user should participate in the first community, based on the association of the first user and the second user with the first representation of the first community;
creating a first representation of a second community based on the division of the second segment;
disassociating the first user from the first representation of the first community, based on the determination that the first user should not participate in the first community;
associating the first user with the first representation of the second community, subsequent to the disassociation;
providing a network communication service to communicate between the first terminal and the second terminal; and
displaying, on a display screen of the first terminal, a first table of contents that indicates titles of the plurality of sequential content items; and
displaying, on the display screen of the first terminal, a second table of contents indicating a number of the plurality of users associated with each of the first plurality of segments.

9. The information processing system as recited in claim 2, wherein
the at least one circuitry is further configured to change the association of the first user from the third user to a fourth user of the plurality of users, based on a change of the user-access position data from the first position to a third position within the second segment of the first plurality of segments,
the fourth user is associated with a fourth position within the second segment, and
the second segment is different from the first segment.

10. The information processing system as recited in claim 1, wherein the at least one circuitry is further configured to control the display screen of the first terminal to display the sequential content item and information communicated between the first terminal and the second terminal.

\* \* \* \* \*